US012638808B2

(12) United States Patent
Yamamoto

(10) Patent No.: US 12,638,808 B2
(45) Date of Patent: May 26, 2026

(54) LIGHT SOURCE CONTROL DEVICE, OPERATING METHOD OF LIGHT SOURCE CONTROL DEVICE, OPERATING PROGRAM OF LIGHT SOURCE CONTROL DEVICE, AND DIGITAL HOLOGRAPHY SYSTEM

(71) Applicant: FUJIFILM CORPORATION, Tokyo (JP)

(72) Inventor: Hiroaki Yamamoto, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 318 days.

(21) Appl. No.: 18/436,042

(22) Filed: Feb. 8, 2024

(65) Prior Publication Data

US 2024/0184243 A1 Jun. 6, 2024

Related U.S. Application Data

(63) Continuation of application No. PCT/JP2022/019732, filed on May 9, 2022.

(30) Foreign Application Priority Data

Aug. 17, 2021 (JP) ................................. 2021-132920

(51) Int. Cl.
*G03H 1/08* (2006.01)
*G03H 1/02* (2006.01)
(52) U.S. Cl.
CPC ............. *G03H 1/0866* (2013.01); *G03H 1/02* (2013.01); *G03H 2001/0212* (2013.01);
(Continued)

(58) Field of Classification Search
CPC ................... G03H 1/0866; G03H 1/02; G03H 2001/0212; G03H 2201/0224; G03H 2222/12; G03H 2222/45
(Continued)

(56) References Cited

U.S. PATENT DOCUMENTS

| 2004/0042015 A1 | 3/2004 | Price |
|---|---|---|
| 2004/0042056 A1 | 3/2004 | Price et al. |

(Continued)

FOREIGN PATENT DOCUMENTS

| JP | 2005-537516 A | 12/2005 |
|---|---|---|
| JP | 2014-507645 A | 3/2014 |

(Continued)

OTHER PUBLICATIONS

International Search Report issued in International Application No. PCT/JP2022/019732 on Jul. 12, 2022.

(Continued)

*Primary Examiner* — Jonathan S Lee
(74) *Attorney, Agent, or Firm* — SOLARIS Intellectual Property Group, PLLC

(57) ABSTRACT

A processor performs control of causing illumination light with a first set light quantity to be emitted from a plurality of emission positions one by one in order to obtain a plurality of interference-fringe images serving as a source of a super-resolution interference-fringe image with a resolution exceeding a resolution of an imaging element that picks up an image of interference fringes, and at least one of control of setting a light quantity of the illumination light to a second set light quantity different from the first set light quantity during switching from a current emission position to a next emission position, or control of causing the illumination light to be emitted at a separate emission position separated by at least one emission position from (Continued)

both the current emission position and the next emission position during the switching from the current emission position to the next emission position.

10 Claims, 31 Drawing Sheets

(52) U.S. Cl.
CPC . *G03H 2001/0224* (2013.01); *G03H 2222/12* (2013.01); *G03H 2222/45* (2013.01)

(58) Field of Classification Search
USPC ......................................................... 382/131
See application file for complete search history.

(56) References Cited

U.S. PATENT DOCUMENTS

| | | | |
|---|---|---|---|
| 2004/0042057 | A1 | 3/2004 | Thomas et al. |
| 2013/0280752 | A1 | 10/2013 | Ozcan et al. |
| 2017/0153106 | A1 | 6/2017 | Ozcan et al. |
| 2017/0220000 | A1 | 8/2017 | Ozcan et al. |
| 2019/0146201 | A1* | 5/2019 | Ouchi ................ G02B 21/0076 359/388 |
| 2020/0264559 | A1 | 8/2020 | Sato |
| 2022/0292740 | A1 | 9/2022 | Yamamoto |

FOREIGN PATENT DOCUMENTS

| | | | |
|---|---|---|---|
| JP | 2016-211936 | A | 12/2016 |
| WO | 2019/044336 | A1 | 3/2019 |
| WO | 2021/117328 | A1 | 6/2021 |

OTHER PUBLICATIONS

Written Opinion of the ISA issued in International Application No. PCT/JP2022/019732 on Jul. 12, 2022.

Waheb Bishara et al., "Holographic pixel super-resolution in portable lensless on-chip microscopy using a fiber-optic array", Lab On a Chip, The Royal Society of Chemistry 2011, vol. 11, No. 7, Jan. 1, 2011, p. 1276.

Extended European Search Report dated Dec. 2, 2024, issued in corresponding EP Patent Application No. 22858119.5.

English language translation of the following: Office action dated Apr. 21, 2026 from the JPO in a Japanese patent application No. 2023-542224 corresponding to the instant patent application.

\* cited by examiner

| CURRENT EMISSION POSITION | NEXT EMISSION POSITION | EMISSION POSITION WITH SECOND SET LIGHT QUANTITY |
|---|---|---|
| IP11 | IP12 | IP11,IP12,IP21,IP22 |
| IP12 | IP13 | IP12,IP13,IP22,IP23 |
| IP13 | IP14 | IP13,IP14,IP23,IP24 |
| IP14 | IP15 | IP14,IP15,IP24,IP25 |
| IP15 | IP21 | IP15,IP21,IP25,IP31 |
| IP21 | IP22 | IP21,IP22,IP31,IP32 |
| IP22 | IP23 | IP22,IP23,IP32,IP33 |
| IP23 | IP24 | IP23,IP24,IP33,IP34 |
| IP24 | IP25 | IP24,IP25,IP34,IP35 |
| IP25 | IP31 | IP25,IP31,IP35,IP41 |
| IP31 | IP32 | IP31,IP32,IP41,IP42 |
| IP32 | IP33 | IP32,IP33,IP42,IP43 |
| IP33 | IP34 | IP33,IP34,IP43,IP44 |
| IP34 | IP35 | IP34,IP35,IP44,IP45 |
| IP35 | IP41 | IP35,IP41,IP45,IP51 |
| IP41 | IP42 | IP41,IP42,IP51,IP52 |
| IP42 | IP43 | IP42,IP43,IP52,IP53 |
| IP43 | IP44 | IP43,IP44,IP53,IP54 |
| IP44 | IP45 | IP44,IP45,IP54,IP55 |
| IP45 | IP51 | IP11,IP45,IP51,IP55 |
| IP51 | IP52 | IP11,IP12,IP51,IP52 |
| IP52 | IP53 | IP12,IP13,IP52,IP53 |
| IP53 | IP54 | IP13,IP14,IP53,IP54 |
| IP54 | IP55 | IP14,IP15,IP54,IP55 |
| IP55 | | |

| CURRENT EMISSION POSITION | NEXT EMISSION POSITION | SEPARATE EMISSION POSITION |
|---|---|---|
| IP11 | IP12 | IP31 |
| IP12 | IP13 | IP32 |
| IP13 | IP14 | IP33 |
| IP14 | IP15 | IP34 |
| IP15 | IP21 | IP35 |
| IP21 | IP22 | IP41 |
| IP22 | IP23 | IP42 |
| IP23 | IP24 | IP43 |
| IP24 | IP25 | IP44 |
| IP25 | IP31 | IP45 |
| IP31 | IP32 | IP51 |
| IP32 | IP33 | IP52 |
| IP33 | IP34 | IP53 |
| IP34 | IP35 | IP54 |
| IP35 | IP41 | IP55 |
| IP41 | IP42 | IP21 |
| IP42 | IP43 | IP22 |
| IP43 | IP44 | IP23 |
| IP44 | IP45 | IP24 |
| IP45 | IP51 | IP25 |
| IP51 | IP52 | IP31 |
| IP52 | IP53 | IP32 |
| IP53 | IP54 | IP33 |
| IP54 | IP55 | IP34 |
| IP55 | | |

| | CURRENT EMISSION POSITION | NEXT EMISSION POSITION | SEPARATE EMISSION POSITION | |
|---|---|---|---|---|
| SELECTED ◄-- | IP11 | IP12 | IP31 --► | SELECTED |
| SELECTED ◄-- | IP12 | IP13 | IP32 --► | SELECTED |
| SELECTED ◄-- | IP13 | IP14 | IP33 --► | SELECTED |
| SELECTED ◄-- | IP14 | IP15 | IP34 --► | SELECTED |
| SELECTED ◄-- | IP15 | IP21 | IP35 --► | SELECTED |
| SELECTED ◄-- | IP21 | IP22 | IP41 --► | SELECTED |
| SELECTED ◄-- | IP22 | IP23 | IP42 --► | SELECTED |
| SELECTED ◄-- | IP23 | IP24 | IP43 --► | SELECTED |
| SELECTED ◄-- | IP24 | IP25 | IP44 --► | SELECTED |
| SELECTED ◄-- | IP25 | IP31 | IP45 --► | SELECTED |
| SELECTED ◄-- | IP51 | IP52 | IP31 --► | DISCARDED |
| SELECTED ◄-- | IP52 | IP53 | IP32 --► | DISCARDED |
| SELECTED ◄-- | IP53 | IP54 | IP33 --► | DISCARDED |
| SELECTED ◄-- | IP54 | IP55 | IP34 --► | DISCARDED |
| SELECTED ◄-- | IP55 | | | |

| CURRENT EMISSION POSITION | NEXT EMISSION POSITION | SEPARATE EMISSION POSITION |
|---|---|---|
| IP11 | IP12 | IP31,IP32 |
| IP12 | IP13 | IP32,IP33 |
| IP13 | IP14 | IP33,IP34 |
| IP14 | IP15 | IP34,IP35 |
| IP15 | IP21 | IP35,IP41 |
| IP21 | IP22 | IP41,IP42 |
| IP22 | IP23 | IP42,IP43 |
| IP23 | IP24 | IP43,IP44 |
| IP24 | IP25 | IP44,IP45 |
| IP25 | IP31 | IP45,IP51 |
| IP31 | IP32 | IP51,IP52 |
| IP32 | IP33 | IP52,IP53 |
| IP33 | IP34 | IP53,IP54 |
| IP34 | IP35 | IP54,IP55 |
| IP35 | IP41 | IP55,IP21 |
| IP41 | IP42 | IP21,IP22 |
| IP42 | IP43 | IP22,IP23 |
| IP43 | IP44 | IP23,IP24 |
| IP44 | IP45 | IP24,IP25 |
| IP45 | IP51 | IP25,IP31 |
| IP51 | IP52 | IP31,IP32 |
| IP52 | IP53 | IP32,IP33 |
| IP53 | IP54 | IP33,IP34 |
| IP54 | IP55 | IP34,IP35 |
| IP55 | | |

220

1

LIGHT SOURCE CONTROL DEVICE, OPERATING METHOD OF LIGHT SOURCE CONTROL DEVICE, OPERATING PROGRAM OF LIGHT SOURCE CONTROL DEVICE, AND DIGITAL HOLOGRAPHY SYSTEM

CROSS-REFERENCE TO RELATED APPLICATIONS

This application is a continuation application of International Application No. PCT/JP2022/019732, filed on May 9, 2022, the disclosure of which is incorporated herein by reference in its entirety. Further, this application claims priority from Japanese Patent Application No. 2021-132920, filed on Aug. 17, 2021, the disclosure of which is incorporated herein by reference in its entirety.

BACKGROUND

1. Technical Field

The technology of the present disclosure relates to a light source control device, an operating method of the light source control device, an operating program of the light source control device, and a digital holography system.

2. Description of the Related Art

In digital holography, an observation target object is irradiated with illumination light from a light source. Then, an interference-fringe image is output from an imaging element by the imaging element picking up an image of interference fringes between diffracted light that is the illumination light diffracted by the observation target object and reference light that is the illumination light that does not pass through the observation target object. The interference-fringe image includes information in the thickness direction of the observation target object along an irradiation direction of the illumination light. Thus, a reconstructed image representing any tomographic plane of the observation target object can be obtained by performing appropriate arithmetic processing on the interference-fringe image.

WO2021/117328A describes a technology of generating a super-resolution interference-fringe image with a resolution exceeding the resolution of an imaging element and generating a reconstructed image from the super-resolution interference-fringe image. Specifically, in WO2021/117328A, illumination light is emitted from a plurality of emission positions one by one, and an interference-fringe image for each of the plurality of emission positions is output. Then, a super-resolution interference-fringe image is generated based on the plurality of interference-fringe images at the respective emission positions. The interval between adjacent emission positions is, for example, several tens of micrometers. In WO2021/117328A, control of synchronizing the emission timing of illumination light by a light source and the imaging timing of an interference-fringe image by the imaging element is performed.

SUMMARY

The control of synchronizing the emission timing of the illumination light and the imaging timing of the interference-fringe image described in WO2021/117328A takes time and troublesome. Accordingly, the inventor has devised a method of eliminating the need for the control of synchronizing the emission timing of the illumination light and the imaging timing of the interference-fringe image, and generating a super-resolution interference-fringe image based on only information on an image without using information on the emission timing and the imaging timing. That is, this is a method in which a plurality of images are continuously output from the imaging element while the illumination light is emitted from the plurality of emission positions one by one.

In the above-described method, it is determined from the image that the emission position of the illumination light has been switched. However, since the interval between the adjacent emission positions is extremely as small as, for example, several tens of micrometers, it is not possible to determine from the image that the emission position of the illumination light has been switched, and there is a concern that generation of a super-resolution interference-fringe image will be hindered.

One embodiment according to the technology of the present disclosure provides a light source control device, an operating method of the light source control device, an operating program of the light source control device, and a digital holography system capable of smoothly proceeding with generation of a super-resolution interference-fringe image.

A light source control device according to the present disclosure is a light source control device that controls an operation of a light source that irradiates an observation target object with illumination light to generate interference fringes of the observation target object, the light source having a configuration in which a plurality of light emitting units of the illumination light are arranged at a plurality of emission positions. The light source control device includes a processor. The processor performs control of causing the illumination light with a first set light quantity to be emitted from the plurality of emission positions one by one in order to obtain a plurality of interference-fringe images serving as a source of a super-resolution interference-fringe image with a resolution exceeding a resolution of an imaging element that picks up an image of the interference fringes, and at least one of control of setting a light quantity of the illumination light to a second set light quantity different from the first set light quantity during switching from a current emission position to a next emission position, or control of causing the illumination light to be emitted at a separate emission position separated by at least one emission position from both the current emission position and the next emission position during the switching from the current emission position to the next emission position.

The processor preferably sets the light quantity of the illumination light to the second set light quantity by causing the illumination light to be simultaneously emitted at at least two emission positions during the switching from the current emission position to the next emission position.

The processor preferably sets the light quantity of the illumination light to the second set light quantity by causing the illumination light not to be emitted during the switching from the current emission position to the next emission position.

When the control of causing the illumination light to be emitted at the separate emission position during the switching from the current emission position to the next emission position is performed, the interference-fringe image obtained at the separate emission position is also preferably used in addition to the interference-fringe images obtained at the current emission position and the next emission position to generate the super-resolution interference-fringe image.

The light source is preferably a vertical cavity surface emitting laser array element.

The observation target object is preferably a cell being cultured.

The illumination light is preferably coherent light.

An operating method of a light source control device according to the present disclosure is an operating method of a light source control device that controls an operation of a light source that irradiates an observation target object with illumination light to generate interference fringes of the observation target object, the light source having a configuration in which a plurality of light emitting units of the illumination light are arranged at a plurality of emission positions. The operating method includes performing control of causing the illumination light with a first set light quantity to be emitted from the plurality of emission positions one by one in order to obtain a plurality of interference-fringe images serving as a source of a super-resolution interference-fringe image with a resolution exceeding a resolution of an imaging element that picks up an image of the interference fringes; and performing at least one of control of setting a light quantity of the illumination light to a second set light quantity different from the first set light quantity during switching from a current emission position to a next emission position, or control of causing the illumination light to be emitted at a separate emission position separated by at least one emission position from both the current emission position and the next emission position during the switching from the current emission position to the next emission position.

An operating program of a light source control device according to the present disclosure is an operating program of a light source control device that controls an operation of a light source that irradiates an observation target object with illumination light to generate interference fringes of the observation target object, the light source having a configuration in which a plurality of light emitting units of the illumination light are arranged at a plurality of emission positions. The operating program causes a computer to execute processing. The processing includes performing control of causing the illumination light with a first set light quantity to be emitted from the plurality of emission positions one by one in order to obtain a plurality of interference-fringe images serving as a source of a super-resolution interference-fringe image with a resolution exceeding a resolution of an imaging element that picks up an image of the interference fringes; and performing at least one of control of setting a light quantity of the illumination light to a second set light quantity different from the first set light quantity during switching from a current emission position to a next emission position, or control of causing the illumination light to be emitted at a separate emission position separated by at least one emission position from both the current emission position and the next emission position during the switching from the current emission position to the next emission position.

A digital holography system according to the present disclosure is a digital holography system including the light source; the above-described light source control device; and the imaging element. The imaging element continuously outputs a plurality of images while the light source emits the illumination light with the first set light quantity from the plurality of emission positions one by one.

According to the technology of the present disclosure, it is possible to provide the light source control device, the operating method of the light source control device, the operating program of the light source control device, and the digital holography system capable of smoothly proceeding with the generation of the super-resolution interference-fringe image.

BRIEF DESCRIPTION OF THE DRAWINGS

Exemplary embodiments according to the technique of the present disclosure will be described in detail based on the following figures, wherein:

FIGS. 8A and 8B are diagrams conceptually illustrating the generation principle of a super-resolution interference-fringe image, FIG. 8A illustrating a case where coherent light is emitted from a certain light emitting unit, FIG. 8B illustrating a case where coherent light is emitted from a light emitting unit adjacent to the light emitting unit in FIG. 8A in the X direction;

FIG. 14 is a table summarizing a current emission position, a next emission position, and an emission position of coherent light with a second set light quantity;

FIG. 23 is a diagram illustrating an example of an outline of arithmetic processing by a reconstruction processing unit;

FIG. 32 is a table summarizing a current emission position, a next emission position, and a separate emission position according to Embodiment 2-1;

FIG. 33 is a diagram illustrating an outline of processing of an image selection unit according to Embodiment 2-1;

FIG. 34 is a table summarizing a current emission position, a next emission position, and a separate emission position according to Embodiment 2-2;

FIG. 36 is a diagram illustrating an outline of the processing of the image selection unit according to Embodiment 2-2;

FIG. 38 is a table summarizing a current emission position, a next emission position, and a separate emission position according to the combined mode of Embodiment 1 and Embodiment 2.

DETAILED DESCRIPTION

Embodiment 1

Figure 1:
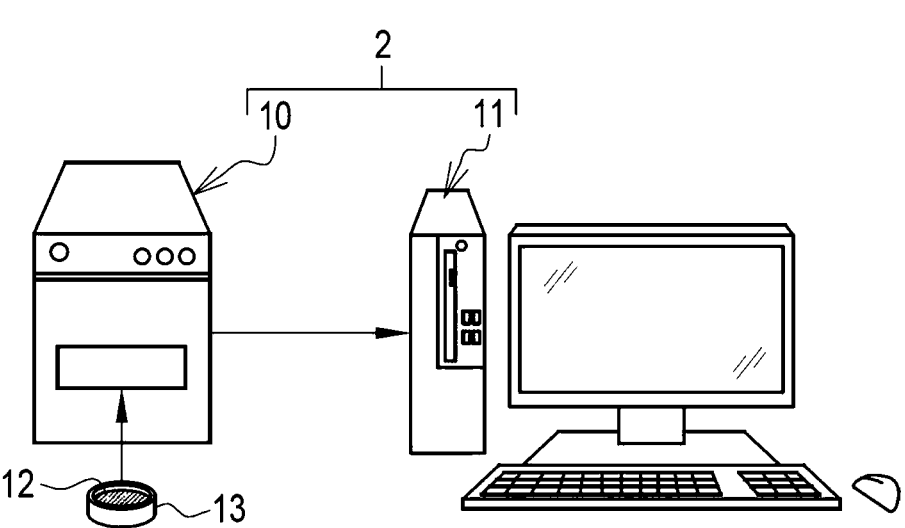
FIG. 1 is a diagram illustrating a digital holography system.

As illustrated in FIG. 1 as an example, a digital holography system 2 includes an imaging apparatus 10 and an information processing apparatus 11. The imaging apparatus 10 and the information processing apparatus 11 are electrically connected to each other, and can exchange data with each other. A culture container 13 for a cell 12 is introduced into the imaging apparatus 10. The cell 12 is, for example, an induced pluripotent stem (iPS) cell, a fertilized egg, or the like, and is an example of an "observation target object" according to the technology of the present disclosure. The information processing apparatus 11 is, for example, a desktop-type personal computer.

Figure 2:
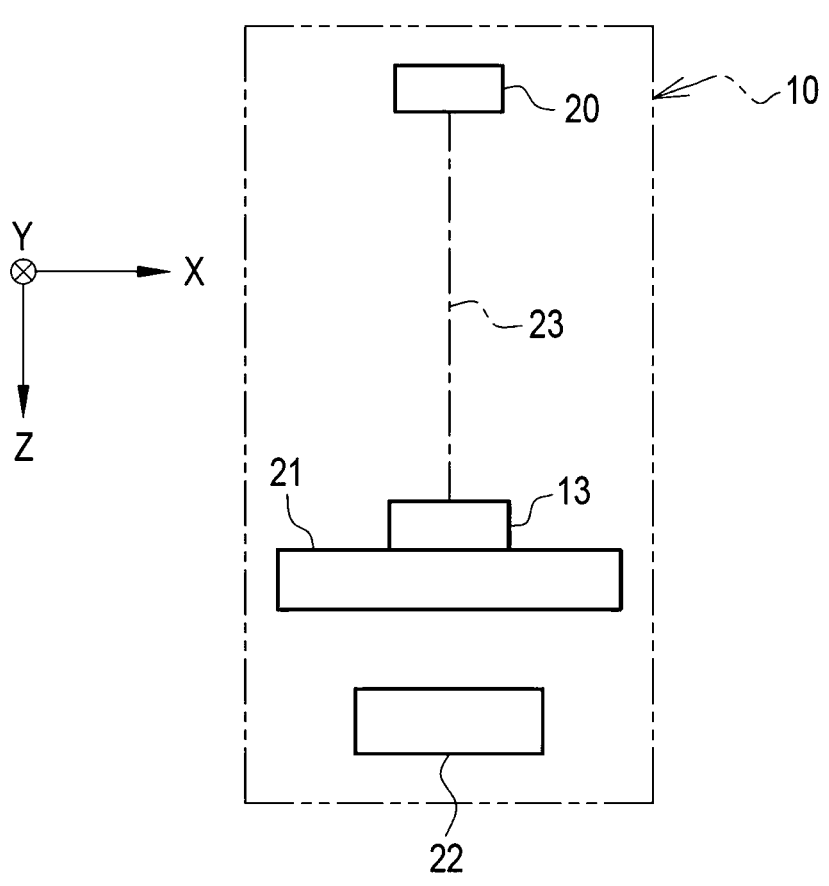
FIG. 2 is a diagram illustrating an imaging apparatus.

As illustrated in FIG. 2 as an example, the imaging apparatus 10 includes a light source 20, a stage 21, and an imaging element 22. The light source 20 emits coherent light 23 toward the culture container 13 placed on the stage 21.

Figure 3:
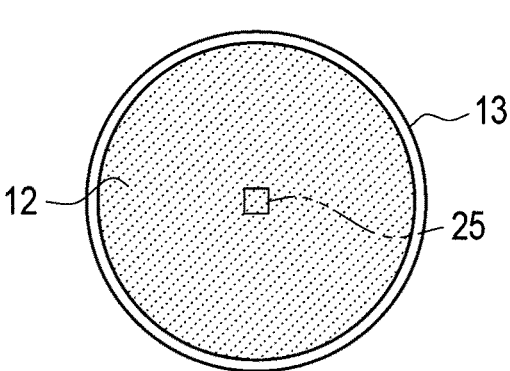
FIG. 3 is a view illustrating a part to be observed.

The coherent light 23 is incident on the cell 12 and the culture container 13. More specifically, as illustrated in FIG. 3 as an example, the entire region of a part to be observed 25 that is a partial region close to the center of the culture container 13 is irradiated with the coherent light 23. The part to be observed 25 has, for example, a size of 1 mm×1 mm. The coherent light 23 is an example of "illumination light" according to the technology of the present disclosure. The Z direction is a direction substantially parallel to an irradiation direction of the coherent light 23. The X direction and the Y direction are directions orthogonal to the Z direction and parallel to an imaging surface 32 (see FIG. 4) of the imaging element 22. Also, the X direction and the Y direction are directions orthogonal to each other and extending along an arrangement direction of pixels 45 (see FIGS. 8A and 8B) of the imaging element 22.

Figure 4:
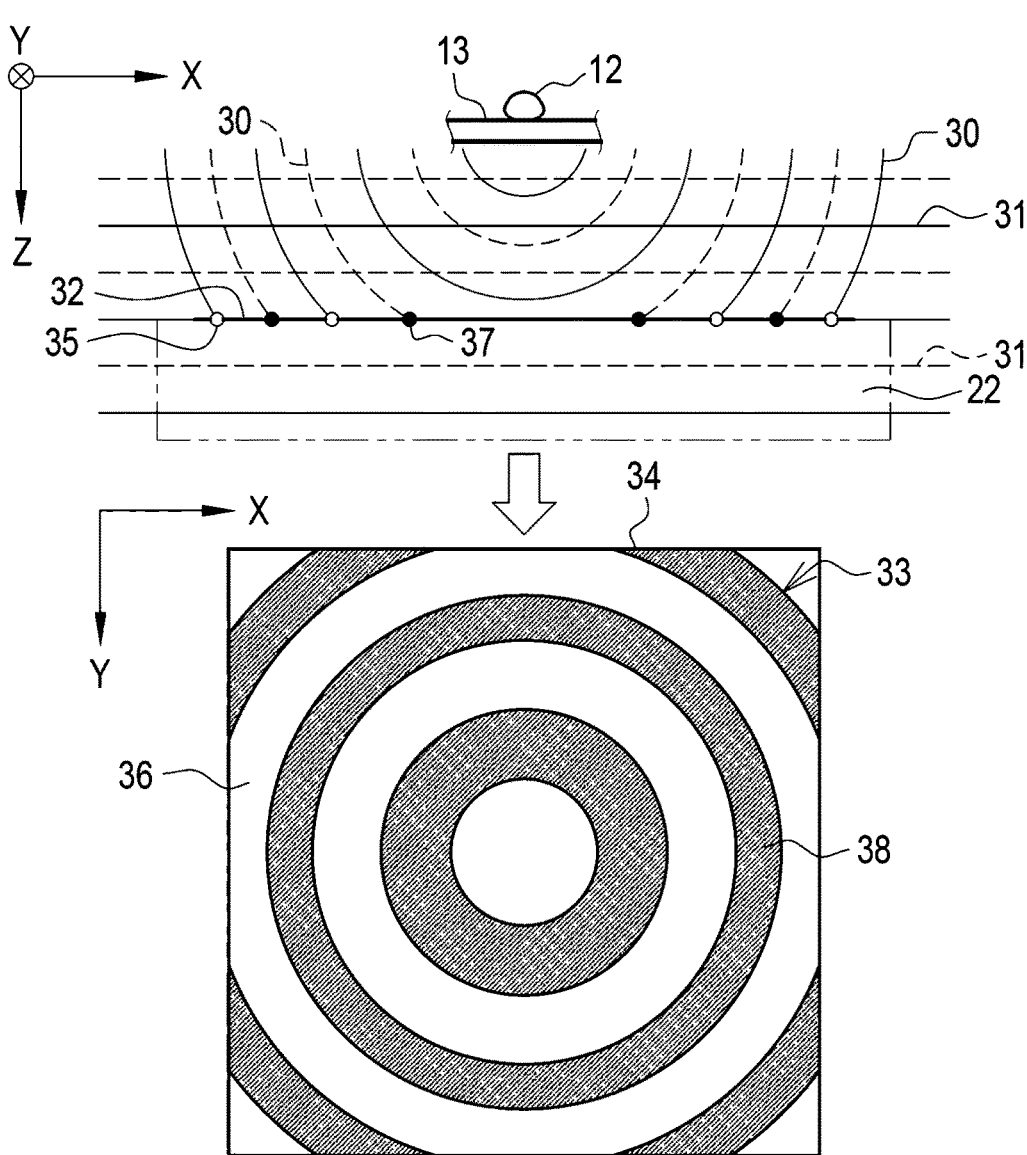
FIG. 4 is a diagram illustrating states of diffracted light and transmitted light in the vicinity of an imaging surface of an imaging element, and an interference-fringe image.

As illustrated in FIG. 4 as an example, the coherent light 23 incident on the cell 12 and the culture container 13 is divided into diffracted light 30 diffracted by the cell 12 and the culture container 13 and transmitted light (also referred to as reference light) 31 transmitted without passing through the cell 12 and the culture container 13. The diffracted light 30 and the transmitted light 31 interfere with each other on the imaging surface 32 of the imaging element 22, and interference fringes 33 are generated. The imaging element 22 picks up an image of the interference fringes 33 and outputs an interference-fringe image 34.

Figures 5A, 5B:
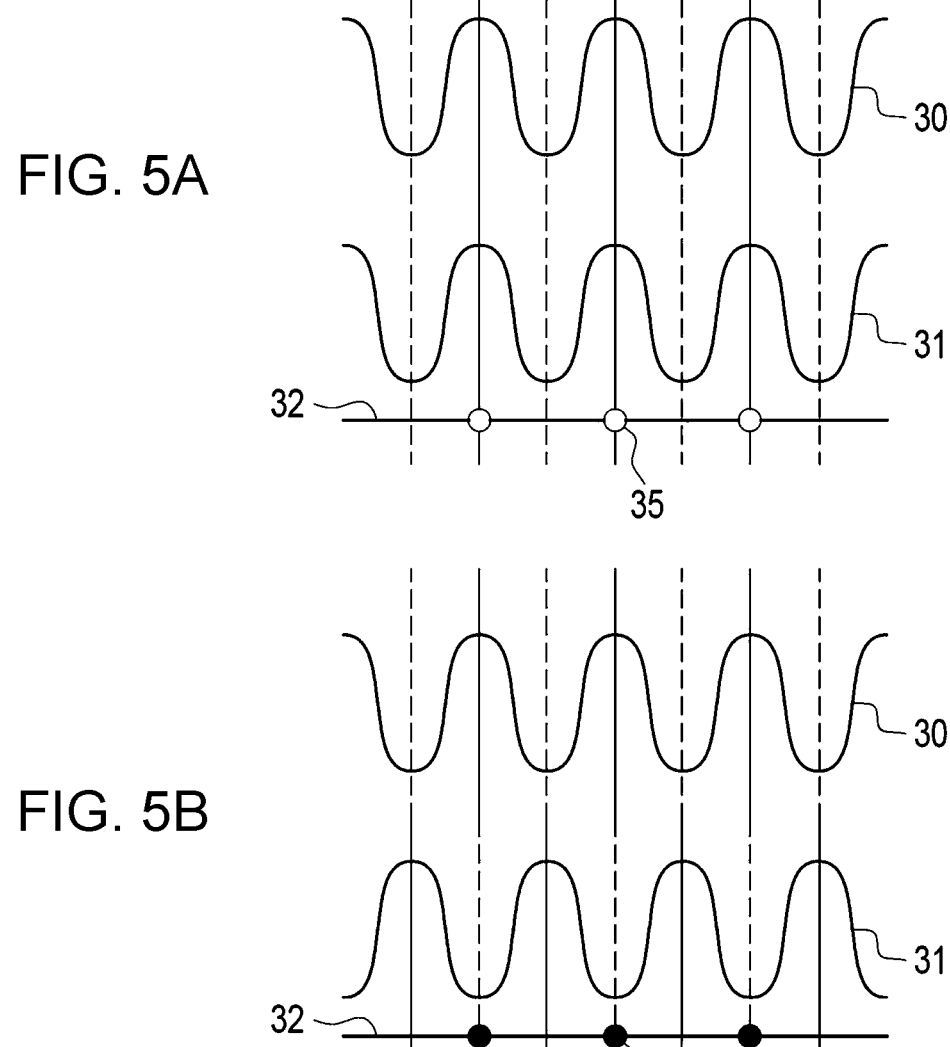
FIGS. 5A and 5B are diagrams for explaining the formation of interference fringes, FIG. 5A illustrating the formation of a bright portion of the interference fringes, FIG. 5B illustrating the formation of a dark portion of the interference fringes.

As illustrated in FIGS. 5A and 5B as an example, among lines indicating the diffracted light 30 and the transmitted light 31, solid lines indicate the wavefronts of the diffracted light 30 and the transmitted light 31 with the maximum amplitudes. In contrast, dashed lines indicate the wavefronts of the diffracted light 30 and the transmitted light 31 with the minimum amplitudes. A white spot 35 illustrated on the imaging surface 32 is a portion where the wavefronts of the diffracted light 30 and the transmitted light 31 are aligned and strengthen each other (see FIG. 5A). The portion of the white spot 35 appears as a bright portion 36 in the interference fringes 33. In contrast, a black spot 37 illustrated on the imaging surface 32 is a portion where the wavefronts of the diffracted light 30 and the transmitted light 31 are shifted by a half-wavelength and weaken each other (see FIG. 5B). The portion of the black spot 37 appears as a dark portion 38 in the interference fringes 33.

Figure 6:
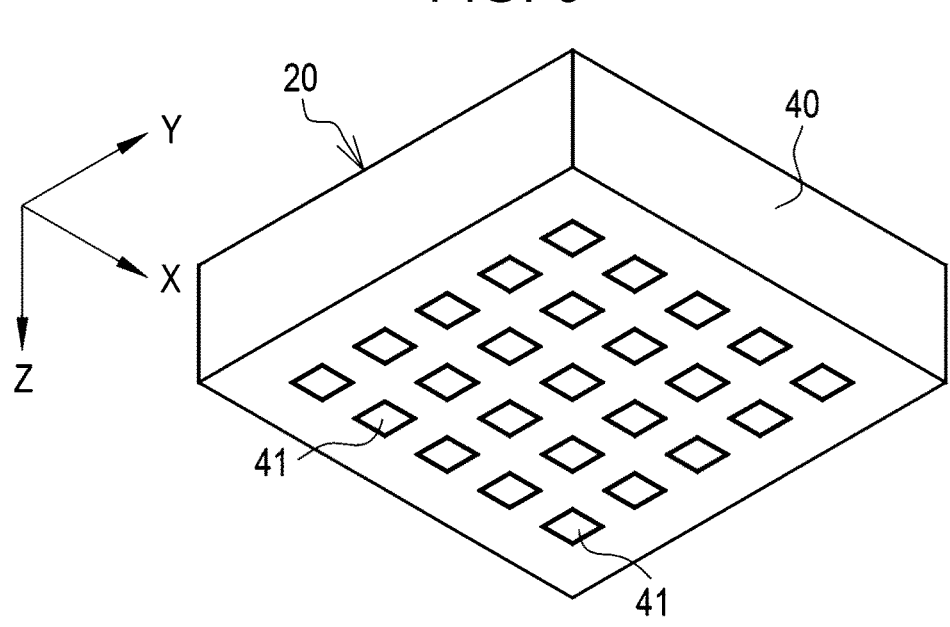
FIG. 6 is a perspective view illustrating a light source.

As illustrated in FIG. 6 as an example, the light source 20 is a vertical cavity surface emitting laser array element (VCSEL), and has a rectangular parallelepiped housing 40. On a surface of the housing 40 facing the stage 21, 5×5=25 of light emitting units 41 are arranged at equal intervals in the X direction and the Y direction. The light emitting units 41 individually emit the coherent light 23. The light emitting units 41 each have a size of, for example, the order of several micrometers. Also, the interval between the adjacent light emitting units 41 is, for example, several tens of micrometers.

Figure 7:
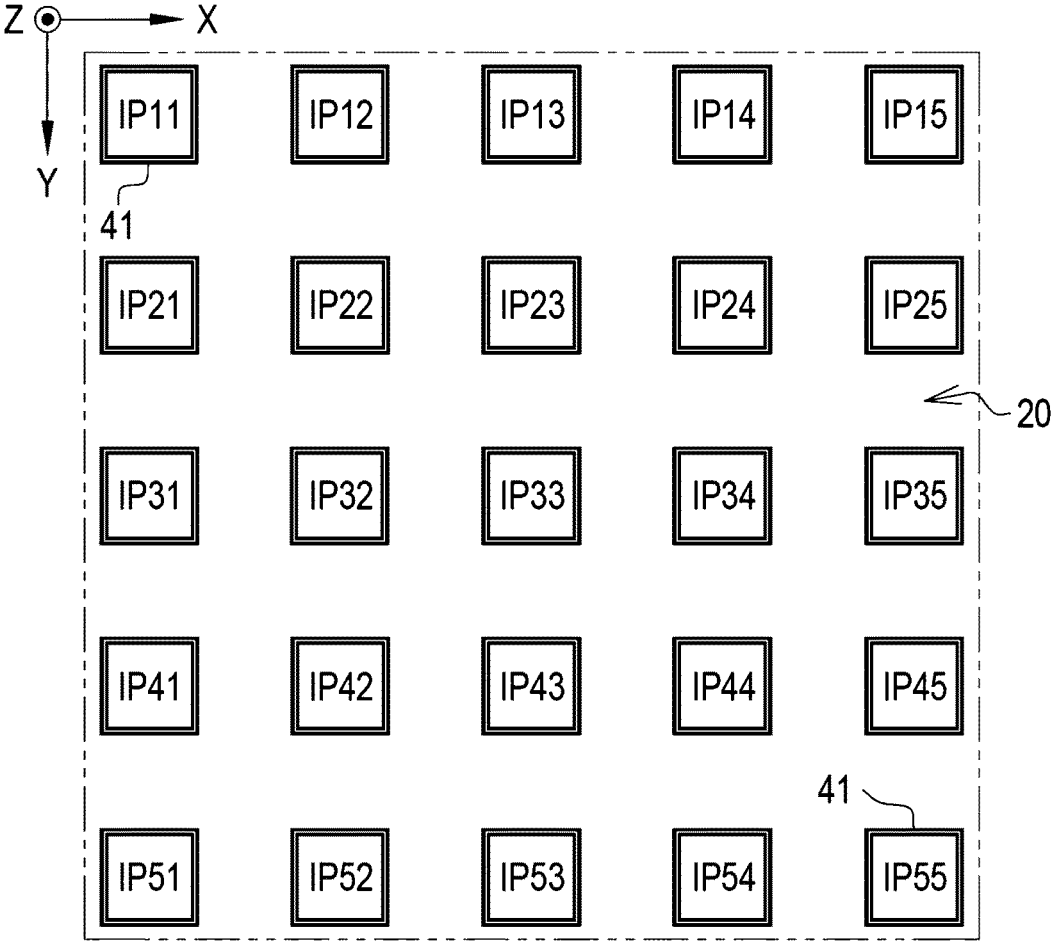
FIG. 7 is a view illustrating installation positions and emission positions of light emitting units.

As illustrated in FIG. 7 as an example, the installation positions of the respective light emitting units 41, such as IP11, IP12, . . . , IP54, and IP55, are a plurality of emission positions of the coherent light 23 having different irradiation angles. By using the light source 20 having such a configuration in which the plurality of light emitting units 41 are arranged at the plurality of emission positions IP11 to IP55, it is possible to generate a super-resolution interference-fringe image 113 (see FIG. 9 and the like) with a resolution exceeding the resolution of the imaging element 22. Note that "having different irradiation angles" means that the incidence angles of the coherent light 23 with respect to the imaging surface 32 of the imaging element 22 are different. Also, FIG. 7 is a view of the light source 20 viewed from the side of the imaging element 22.

Figures 8A, 8B:
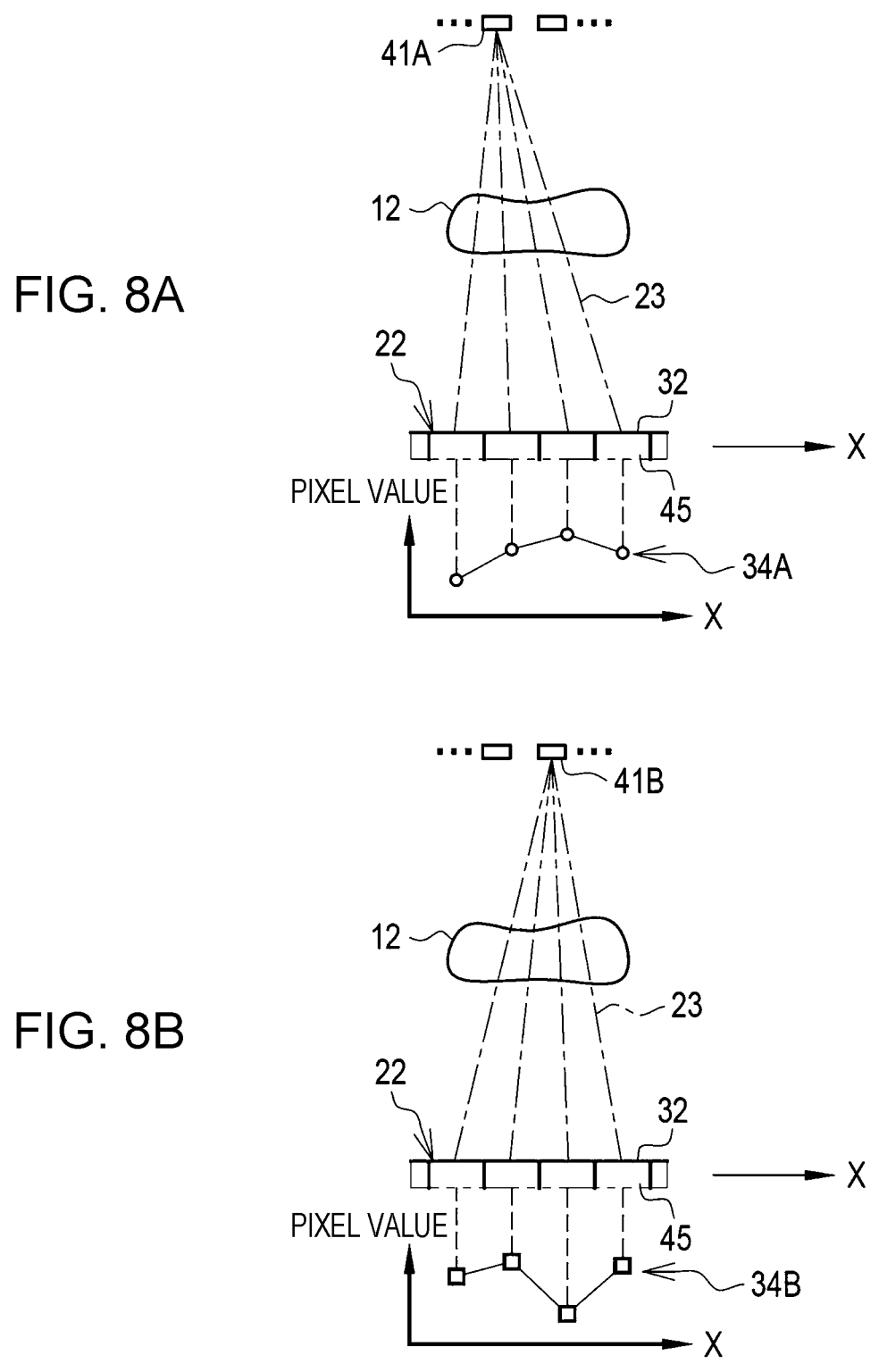
Figure 9:
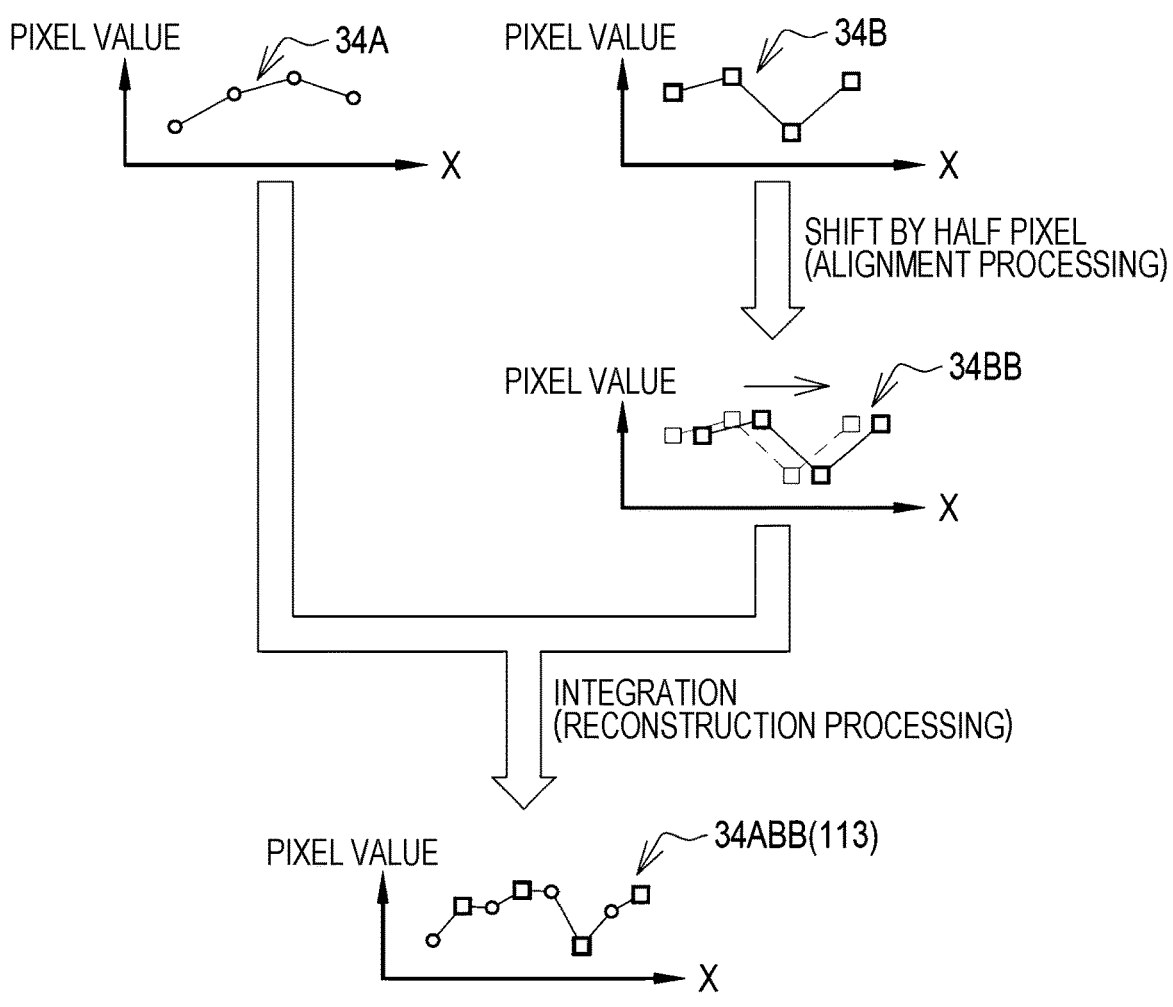
FIG. 9 is a diagram conceptually illustrating the generation principle of the super-resolution interference-fringe image.

FIGS. 8A, 8B, and 9 are diagrams conceptually illustrating the generation principle of the super-resolution interference-fringe image 113. Referring first to FIGS. 8A and 8B, FIG. 8A illustrates a case where coherent light 23 is emitted from a certain light emitting unit 41A, and FIG. 8B illustrates a case where coherent light 23 is emitted from a light emitting unit 41B adjacent to the light emitting unit 41A in the X direction. The incidence angle of the coherent light 23 from the light emitting unit 41A on the cell 12 is different from the incidence angle of the coherent light 23 from the light emitting unit 41B on the cell 12. Accordingly, information on the interference fringes 33 due to the cell 12, which is obtained by the pixels 45 of the imaging element 22, also differs. Thus, interference-fringe images 34A and 34B having different pixel values are obtained in the case of FIG. 8A and the case of FIG. 8B, respectively. Each ○ (white circle) mark represents a pixel value of the interference-fringe image 34A, and each □ (white square) mark represents a pixel value of the interference-fringe image 34B. Note that the pixels 45 of the imaging element 22 each have a size of, for example, 2 μm×2 μm.

It is assumed that sampling points of the cell 12 are shifted by a half of the pixel 45, that is, half a pixel between the case of FIG. 8A and the case of FIG. 8B. In this case, as illustrated in FIG. 9, for example, the interference-fringe image 34B obtained in the case of FIG. 8B is shifted by half a pixel with reference to the interference-fringe image 34A obtained in the case of FIG. 8A to obtain an interference-fringe image 34BB. Then, the interference-fringe image 34A obtained in the case of FIG. 8A and the interference-fringe image 34BB are integrated to obtain an interference-fringe image 34ABB. The interference-fringe image 34ABB is an image having the number of pixels twice that of the interference-fringe image 34A or 34B. That is, the interference-fringe image 34ABB is a super-resolution interference-fringe image 113 with a resolution exceeding the resolution of the imaging element 22. Note that processing of shifting the interference-fringe image 34B by half a pixel to obtain the interference-fringe image 34BB is referred to as alignment processing. Also, processing of integrating the interference-fringe image 34A and the interference-fringe image 34BB is referred to as reconstruction processing.

Although the description is provided in a one-dimensional manner only in the X direction with reference to FIGS. 8A, 8B, and 9, the basic idea of the generation principle of the super-resolution interference-fringe image 113 is the same even in a two-dimensional manner in which the Y direction is added thereto. For example, a case where coherent light 23 is emitted from each of 2×2=4 of the light emitting units 41 adjacent in the X direction and the Y direction, and an interference-fringe image 34 is output from the imaging element 22 each time the coherent light 23 is emitted is considered. In this case, assuming that sampling points of the cell 12 are shifted by half a pixel as described above, a super-resolution interference-fringe image 113 having the number of pixels that is 2×2=4 times that of the interference-fringe image 34 output from the imaging element 22 is obtained.

Figure 10:
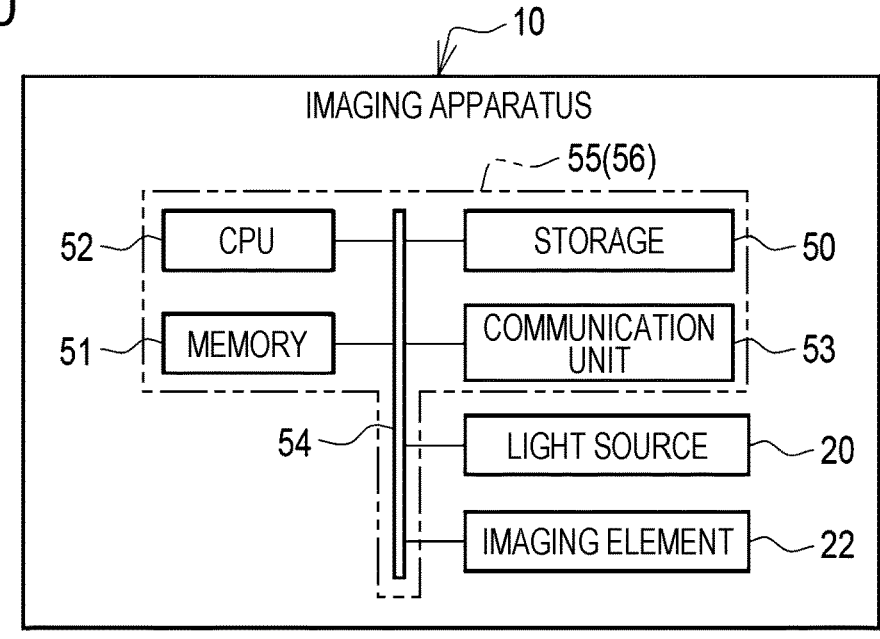
FIG. 10 is a block diagram illustrating an internal configuration of the imaging apparatus.

As illustrated in FIG. 10 as an example, the imaging apparatus 10 includes a storage 50, a memory 51, a central processing unit (CPU) 52, and a communication unit 53. The storage 50, the memory 51, the CPU 52, and the communication unit 53 are connected to each other via a busline 54. The light source 20 and the imaging element 22 are also connected to the busline 54. In addition to these, an operating unit or the like for inputting a shooting start instruction of the interference-fringe image 34 is also connected to the busline 54. The storage 50, the memory 51, the CPU 52, the communication unit 53, and the busline 54 constitute a computer 55. The computer 55 functions as a light source control device 56 of the present disclosure.

The storage 50 is a hard disk drive or a solid state drive. The memory 51 is a work memory for the CPU 52 to execute processing. The CPU 52 loads a program stored in the storage 50 into the memory 51, and executes processing in accordance with the program. Accordingly, the CPU 52 generally controls each unit of the computer 55. The CPU 52 is an example of a "processor" according to the technology of the present disclosure. The communication unit 53 performs transmission control of various kinds of information with an external apparatus such as the information processing apparatus 11 via a network such as a local area network (LAN).

Figure 11:
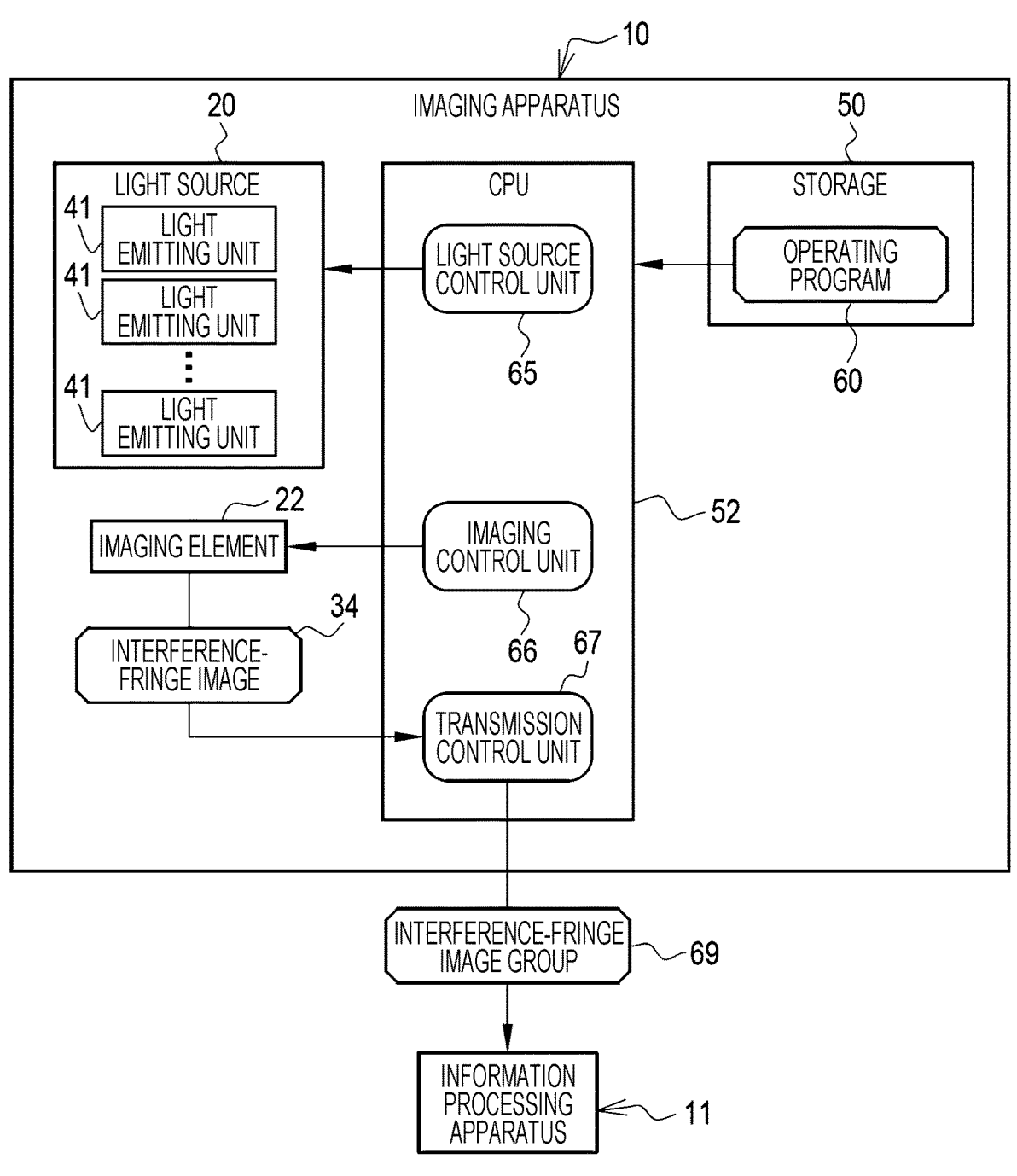
FIG. 11 is a block diagram illustrating processing units of a CPU of the imaging apparatus.

As illustrated in FIG. 11 as an example, an operating program 60 is stored in the storage 50. The operating program 60 is an application program for causing the computer 55 to function as the light source control device 56 of the present disclosure. That is, the operating program 60 is an example of an "operating program of a light source control device" according to the technology of the present disclosure.

When the operating program 60 is activated, the CPU 52 cooperates with the memory 51 and the like to function as a light source control unit 65, an imaging control unit 66, and a transmission control unit 67. Of these units, the light source control unit 65 implements a function of the light source control device 56 of the present disclosure.

The light source control unit 65 controls the operation of the light source 20 to cause the light emitting unit 41 to emit the coherent light 23. The imaging control unit 66 controls the operation of the imaging element 22 to cause the imaging element 22 to output the interference-fringe image 34. The light source control unit 65 and the imaging control unit 66 independently control the operation of the light source 20 and the operation of the imaging element 22, respectively.

The transmission control unit 67 receives the interference-fringe image 34 from the imaging element 22. The transmission control unit 67 performs control of transmitting an interference-fringe image group 69 constituted of a plurality of interference-fringe images 34 to the information processing apparatus 11. Alternatively, the transmission control unit 67 may transmit the interference-fringe images 34 one by one to the information processing apparatus 11.

Figure 12:
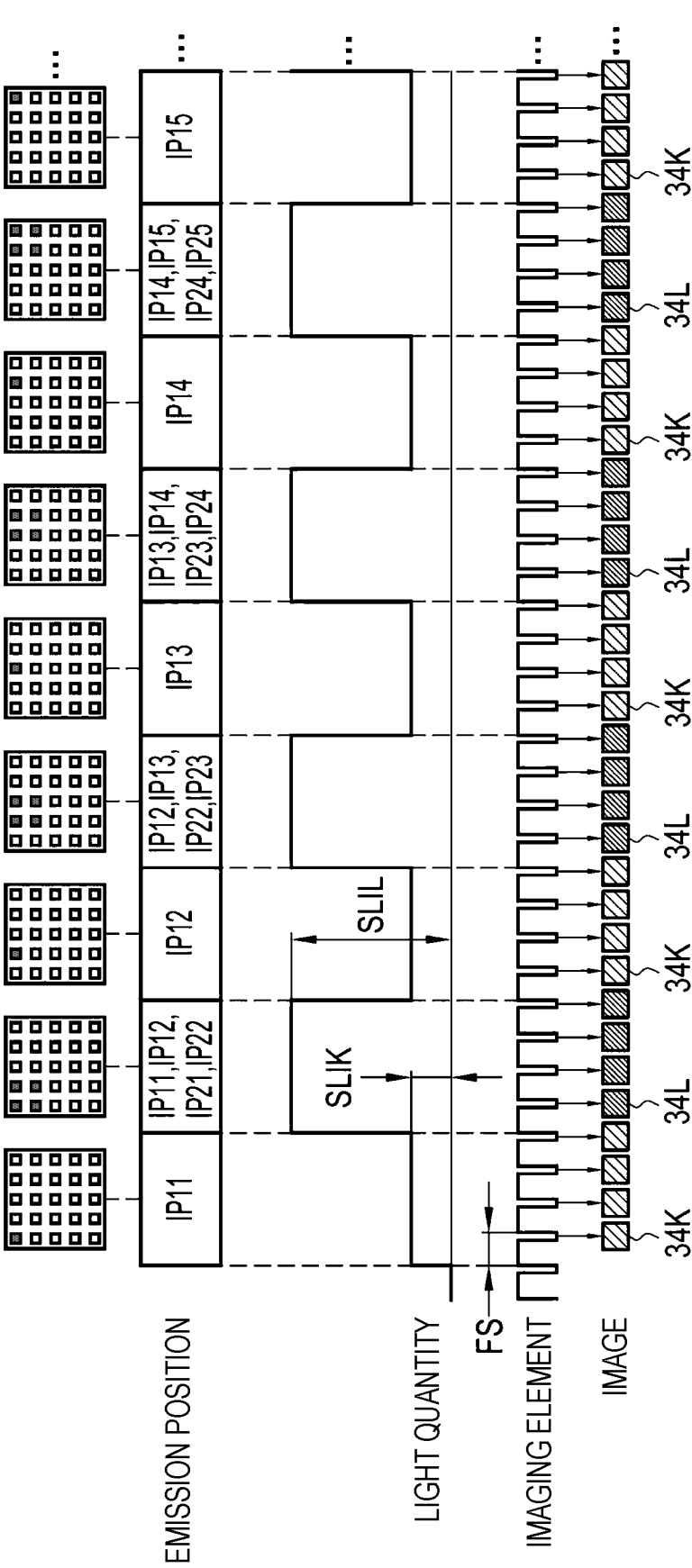
FIG. 12 is a timing chart illustrating a state of operation control of the light source by a light source control unit and operation control of the imaging element by an imaging control unit.
Figure 13:
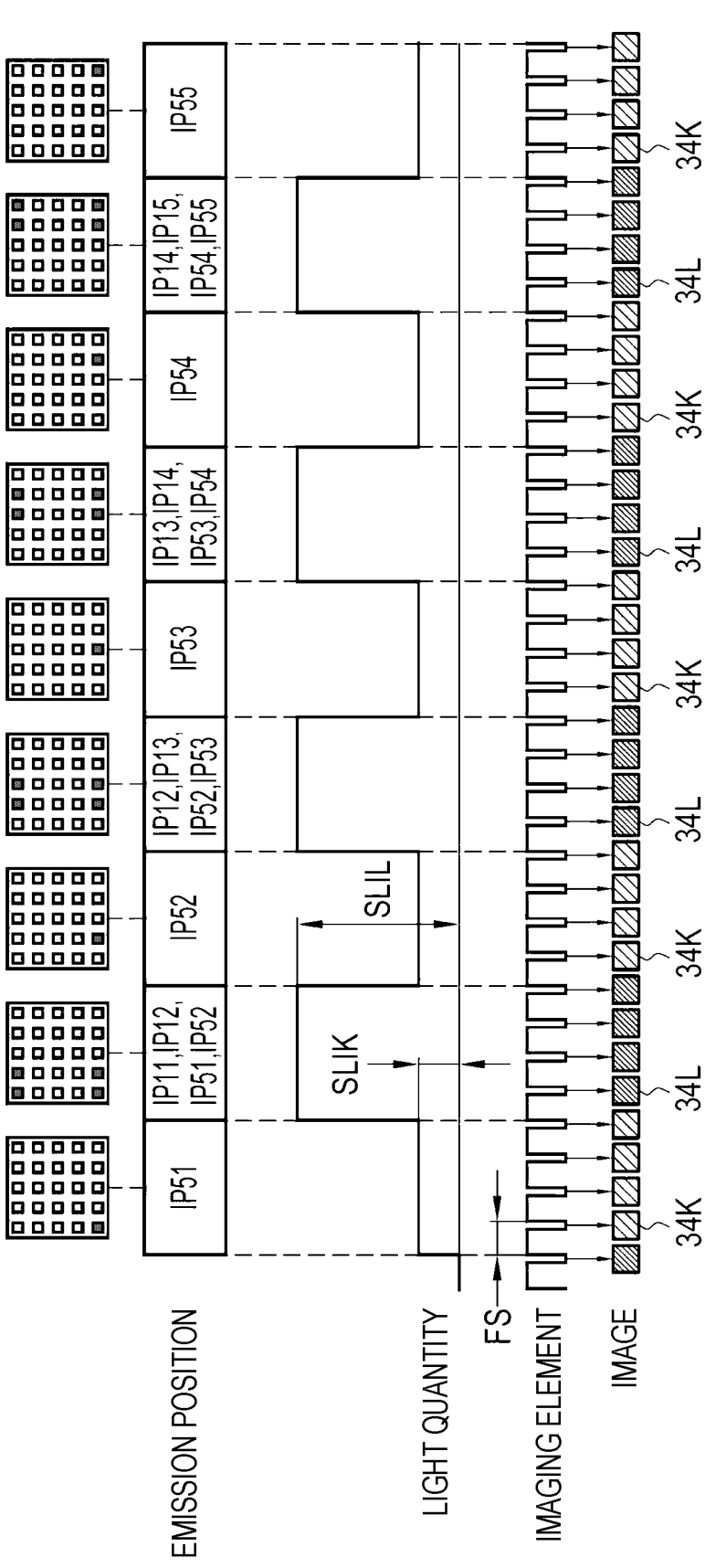
FIG. 13 is a timing chart illustrating a state of the operation control of the light source by the light source control unit and the operation control of the imaging element by the imaging control unit.

As illustrated in FIGS. 12 and 13, and Table 75 in FIG. 14 as an example, when the shooting start instruction of the interference-fringe image 34 is input, the light source control unit 65 performs control of causing the coherent light 23 with a first set light quantity SLIK to be emitted from the emission positions IP11 to IP55 sequentially one by one. Also, the light source control unit 65 performs control of setting the light quantity of the coherent light 23 to a second set light quantity SLIL different from the first set light quantity SLIK during switching from a current emission position IP to a next emission position IP. More specifically, the light source control unit 65 causes the coherent light 23 to be simultaneously emitted at four emission positions IP during switching from the current emission position IP to the next emission position IP, thereby setting the light quantity of the coherent light 23 to the second set light quantity SLIL. Thus, the second set light quantity SLIL is substantially four times the first set light quantity SLIK. The emission time of the coherent light 23 with the second set light quantity SLIL is the same as the emission time of the coherent light 23 with the first set light quantity SLIK from each of the emission positions IP11 to IP55.

The imaging control unit 66 starts the operation of the imaging element 22 before the start of the emission of the coherent light 23 at the emission position IP11. Then, the imaging element 22 is caused to perform so-called motion picture shooting in which the interference-fringe image 34 is continuously output at a predetermined frame interval FS. The frame interval FS is approximately ¼ of the emission interval of the coherent light 23 at one emission position IP, and is, for example, 16.7 msec (60 frames per second (fps) in frame rate conversion). Note that, hereinafter, the interference-fringe image 34 output from the imaging element 22 when the coherent light 23 with the first set light quantity SLIK is emitted is referred to as an interference-fringe image 34K for convenience. Also, the interference-fringe image 34 output from the imaging element 22 when the coherent light 23 with the second set light quantity SLIL is emitted is referred to as an interference-fringe image 34L for convenience.

FIG. 12 illustrates a transition from the emission position IP11 to the emission position IP15. First, the light source control unit 65 causes the coherent light 23 with the first set light quantity SLIK to be emitted from the emission position IP11. During this period, the imaging control unit 66 causes the imaging element 22 to output four interference-fringe images 34K. Subsequently, the light source control unit 65 causes the coherent light 23 to be simultaneously emitted from the emission positions IP11, IP12, IP21, and IP22. That is, the coherent light 23 with the second set light quantity SLIL is emitted from the emission positions IP11, IP12, IP21, and IP22. During this period, the imaging control unit 66 causes the imaging element 22 to output four interference-fringe images 34L. Then, the light source control unit 65 causes the coherent light 23 with the first set light quantity SLIK to be emitted from the emission position IP12. During this period, the imaging control unit 66 causes the imaging element 22 to output four interference-fringe images 34K. Subsequently, the light source control unit 65 causes the coherent light 23 to be simultaneously emitted from the emission positions IP12, IP13, IP22, and IP23. That is, the coherent light 23 with the second set light quantity SLIL is emitted from the emission positions IP12, IP13, IP22, and IP23. During this period, the imaging control unit 66 causes the imaging element 22 to output four interference-fringe images 34L. Thereafter, the light source control unit 65 and the imaging control unit 66 perform similar control.

FIG. 13 illustrates a transition from the emission position IP51 to the emission position IP55. The light source control unit 65 causes the coherent light 23 with the first set light quantity SLIK to be emitted from the emission position IP51. During this period, the imaging control unit 66 causes the imaging element 22 to output four interference-fringe images 34K. Subsequently, the light source control unit 65 causes the coherent light 23 to be simultaneously emitted from the emission positions IP11, IP12, IP51, and IP52. That is, the coherent light 23 with the second set light quantity SLIL is emitted from the emission positions IP11, IP12, IP51, and IP52. During this period, the imaging control unit 66 causes the imaging element 22 to output four interference-fringe images 34L. Then, the light source control unit 65 causes the coherent light 23 with the first set light quantity SLIK to be emitted from the emission position IP52. During this period, the imaging control unit 66 causes the imaging element 22 to output four interference-fringe images 34K. Subsequently, the light source control unit 65 causes the coherent light 23 to be simultaneously emitted from the emission positions IP12, IP13, IP52, and IP53. That is, the coherent light 23 with the second set light quantity SLIL is emitted from the emission positions IP12, IP13, IP52, and IP53. During this period, the imaging control unit 66 causes the imaging element 22 to output four interference-fringe images 34L. Thereafter, the light source control unit 65 and the imaging control unit 66 perform similar control. Then, finally, the coherent light 23 with the first set light quantity SLIK is emitted from the emission position IP55, and four interference-fringe images 34K are output from the imaging element 22. Thus, a plurality of interference-fringe images 34 (a plurality of interference-fringe images 34K and a plurality of interference-fringe images 34L) are obtained. An interference-fringe image group 69 is constituted of the plurality of interference-fringe images 34.

Note that, for convenience of description, FIGS. 12 and 13 illustrate an example in which the switching timing of the emission position IP and the exposure start timing of the frame of the imaging element 22 coincide with each other. However, since the light source 20 and the imaging element 22 are independently controlled, it is rare that the switching timing of the emission position IP and the exposure start timing of the frame of the imaging element 22 coincide with each other in practice. The same applies to FIGS. 27 to 31 described later.

Table 75 in FIG. 14 summarizes the current emission position IP, the next emission position IP, and the emission position IP of the coherent light 23 with the second set light quantity SLIL. For example, when the current emission position IP is IP24, the emission positions IP of the coherent light 23 with the second set light quantity SLIL are IP24, IP25, IP34, and IP35. Also, for example, when the current emission position IP is IP45, the emission positions IP of the coherent light 23 with the second set light quantity SLIL are IP11, IP45, IP51, and IP55.

Figure 15:
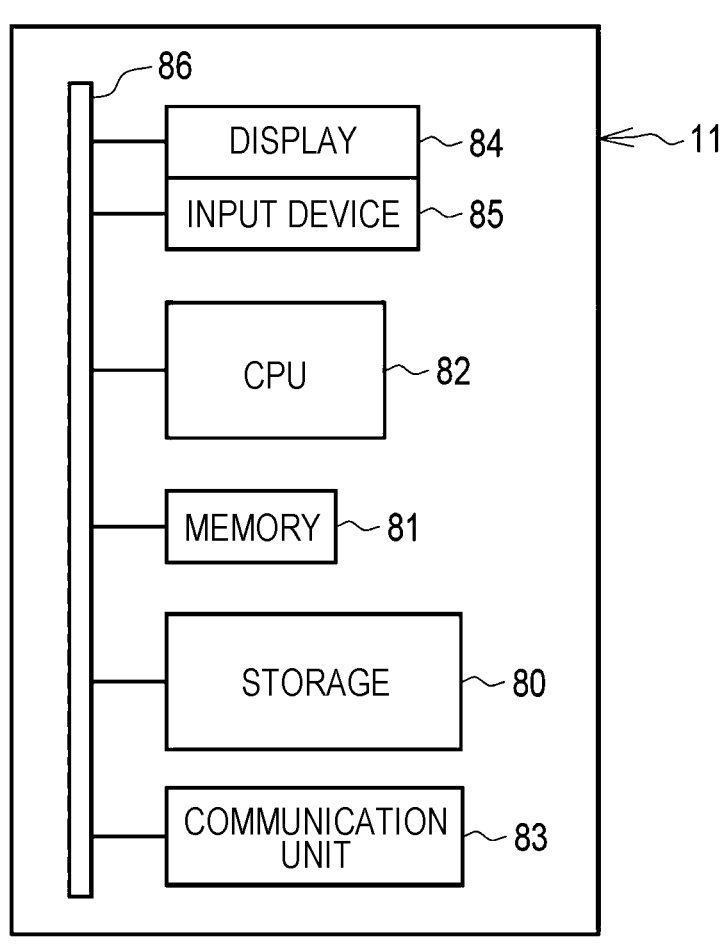
FIG. 15 is a block diagram illustrating a computer constituting an information processing apparatus.

As illustrated in FIG. 15 as an example, the computer constituting the information processing apparatus 11 includes a storage 80, a memory 81, a CPU 82, a communication unit 83, a display 84, and an input device 85. These are connected to each other via a busline 86.

The storage 80 is a hard disk drive built in the computer constituting the information processing apparatus 11 or connected via a cable or a network. Alternatively, the storage 80 is a disk array in which a plurality of hard disk drives are mounted in a connected manner. The storage 80 stores a control program such as an operating system, various application programs, various kinds of data associated with these programs, and the like. Alternatively, a solid state drive may be used instead of the hard disk drive.

The memory 81 is a work memory for the CPU 82 to execute processing. The CPU 82 loads the program stored in the storage 80 into the memory 81, and executes processing in accordance with the program. Accordingly, the CPU 82 generally controls each unit of the computer.

The communication unit 83 performs transmission control of various kinds of information with an external apparatus such as the imaging apparatus 10 via a network such as a LAN. The display 84 displays various screens. The computer constituting the information processing apparatus 11 receives an input of an operation instruction from the input device 85 through the various screens. The input device 85 is a keyboard, a mouse, a touch panel, a microphone for voice input, or the like.

11

12

Figure 16:
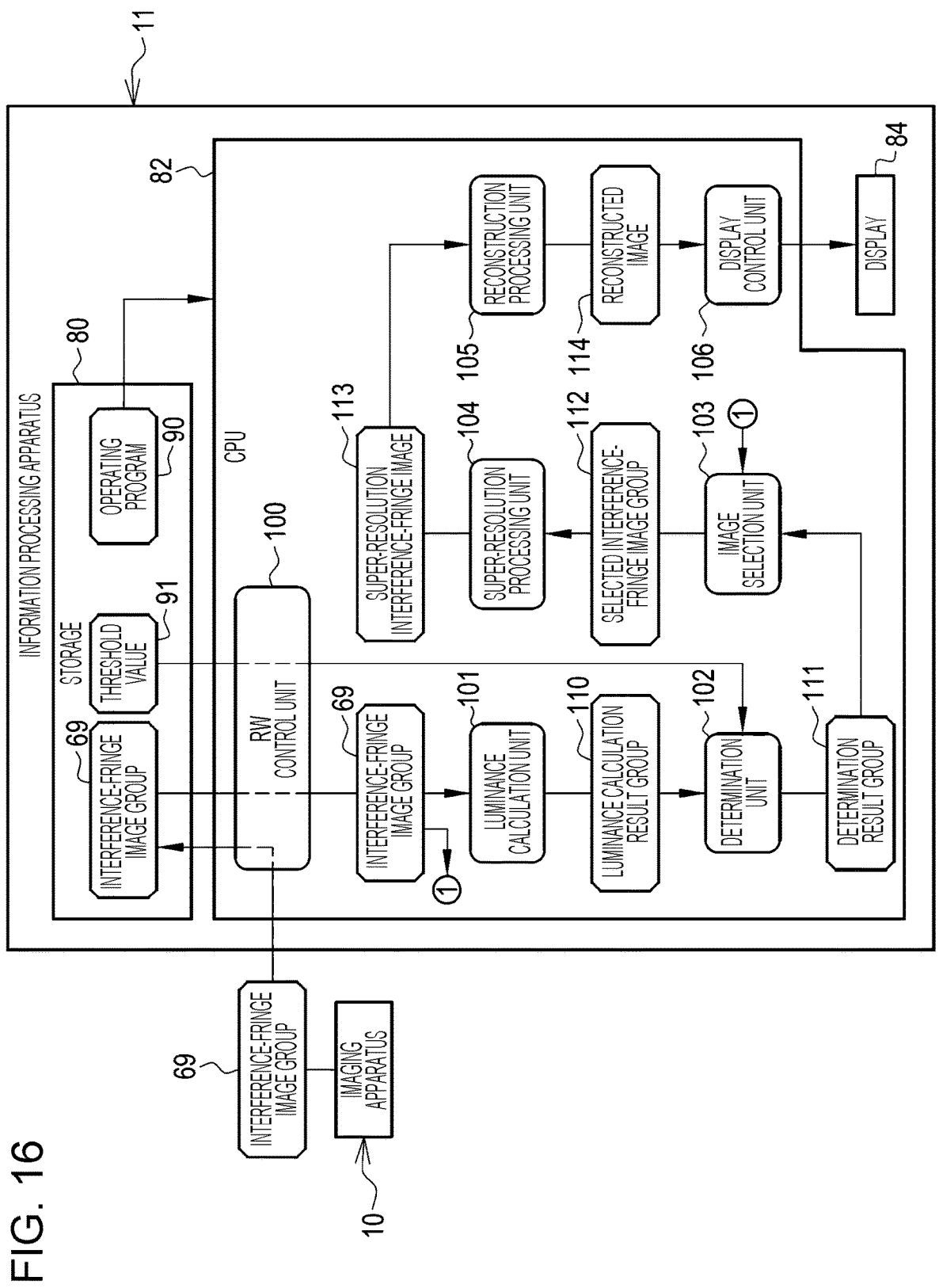
FIG. 16 is a block diagram illustrating processing units of a CPU of the information processing apparatus.

As illustrated in FIG. 16 as an example, the storage 80 of the information processing apparatus 11 stores an operating program 90. The storage 80 also stores an interference-fringe image group 69 and a threshold value 91.

When the operating program 90 is activated, the CPU 82 of the computer constituting the information processing apparatus 11 cooperates with the memory 81 and the like to function as a read write (hereinafter, abbreviated as RW) control unit 100, a luminance calculation unit 101, a determination unit 102, an image selection unit 103, a super-resolution processing unit 104, a reconstruction processing unit 105, and a display control unit 106.

The RW control unit 100 controls storing of various kinds of data in the storage 80 and reading out of various kinds of data in the storage 80. For example, the RW control unit 100 stores the interference-fringe image group 69 from the imaging apparatus 10, in the storage 80. The RW control unit 100 reads out the interference-fringe image group 69 from the storage 80, and outputs the read out interference-fringe image group 69 to the luminance calculation unit 101 and the image selection unit 103. Also, the RW control unit 100 reads out the threshold value 91 from the storage 80, and outputs the read out threshold value 91 to the determination unit 102.

The luminance calculation unit 101 calculates a representative value of luminance for each of the plurality of interference-fringe images 34 constituting the interference-fringe image group 69. The representative value is, for example, an average value, a maximum value, a minimum value, or a mode value. The luminance calculation unit 101 outputs a luminance calculation result group 110 that is a collection of luminance calculation results 120 (see FIG. 17 and the like) of the respective interference-fringe images 34 to the determination unit 102.

The determination unit 102 compares the magnitudes between the threshold value 91 and the luminance calculation result 120. Then, it is determined whether the interference-fringe image 34 indicating the luminance calculation result 120 is the interference-fringe image 34K output from the imaging element 22 when the coherent light 23 with the first set light quantity SLIK is emitted or the interference-fringe image 34L output from the imaging element 22 when the coherent light 23 with the second set light quantity SLIL is emitted. The determination unit 102 outputs a determination result group 111 that is a collection of determination results 121 (see FIG. 17 and the like) of the respective interference-fringe images 34 to the image selection unit 103.

The image selection unit 103 selects the interference-fringe image 34 determined as the interference-fringe image 34K by the determination unit 102 as an interference-fringe image 34 serving as a source of a super-resolution interference-fringe image 113. The image selection unit 103 outputs a selected interference-fringe image group 112 that is a collection of selected interference-fringe images 34 to the super-resolution processing unit 104. Note that, hereinafter, the interference-fringe image 34 selected by the image selection unit 103 is referred to as a selected interference-fringe image 123 (see FIG. 19) for convenience.

The super-resolution processing unit 104 generates a super-resolution interference-fringe image 113 from the selected interference-fringe image group 112. The super-resolution processing unit 104 outputs the super-resolution interference-fringe image 113 to the reconstruction processing unit 105.

The reconstruction processing unit 105 generates a reconstructed image 114 from the super-resolution interference-fringe image 113. The reconstruction processing unit 105 outputs the reconstructed image 114 to the display control unit 106.

The display control unit 106 controls display of various screens on the display 84. The various screens include a reconstructed image display screen 150 (see FIG. 24) for displaying the reconstructed image 114, and the like.

Figure 17:
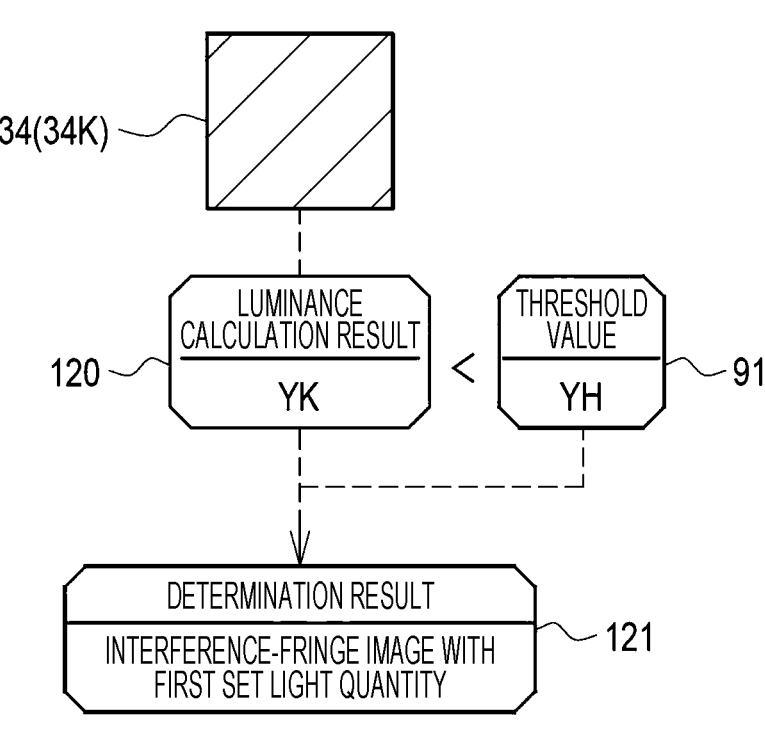
FIG. 17 is a diagram illustrating an outline of processing of a luminance calculation unit and a determination unit.
Figure 18:
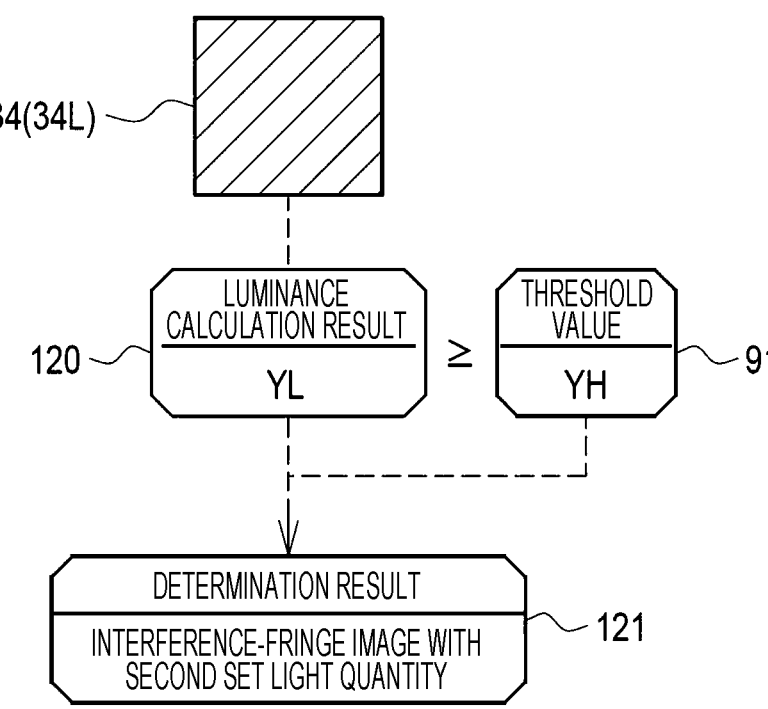
FIG. 18 is a diagram illustrating an outline of processing of the luminance calculation unit and the determination unit.

As illustrated in FIG. 17 as an example, when a luminance YK of a luminance calculation result 120 is less than a luminance YH of the threshold value 91 (YK<YH), the determination unit 102 determines that an interference-fringe image 34 indicating the luminance calculation result 120 is an interference-fringe image 34K output from the imaging element 22 when the coherent light 23 with the first set light quantity SLIK is emitted, and outputs a determination result 121 indicating the determination. In contrast, as illustrated in FIG. 18 as an example, when a luminance YL of a luminance calculation result 120 is equal to or more than the luminance YH of the threshold value 91 (YL≥YH), the determination unit 102 determines that an interference-fringe image 34 indicating the luminance calculation result 120 is an interference-fringe image 34L output from the imaging element 22 when the coherent light 23 with the second set light quantity SLIL is emitted, and outputs a determination result 121 indicating the determination.

Figure 19:
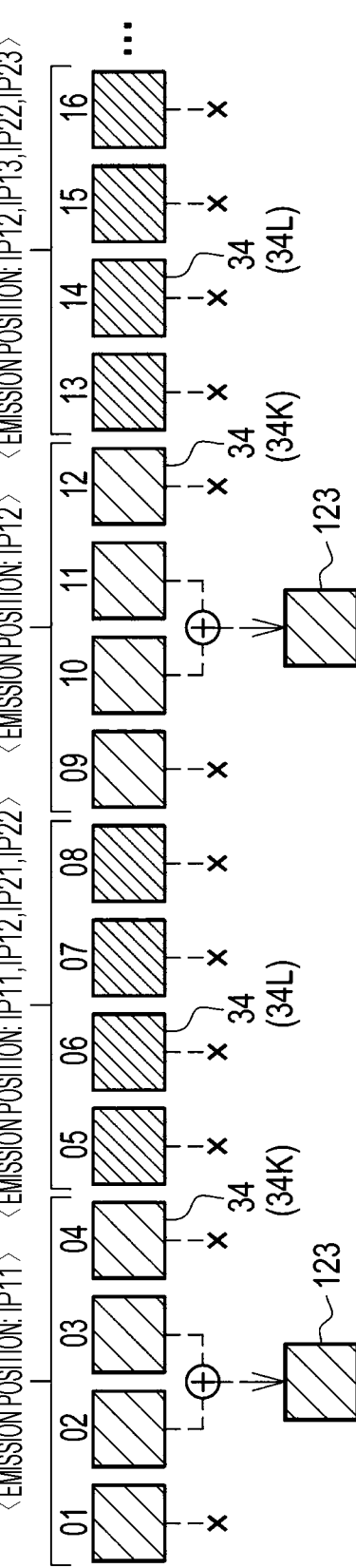
FIG. 19 is a diagram illustrating an outline of processing of an image selection unit.

As illustrated in FIG. 19 as an example, the image selection unit 103 generates a selected interference-fringe image 123 by combining two intermediate interference-fringe images 34 interposed between two first and last interference-fringe images 34 among a series of four interference-fringe images 34 whose determination results 121 indicate interference-fringe images 34K. The combination of the two interference-fringe images 34 is, specifically, processing of adding the pixel values of the respective pixels of the two interference-fringe images 34, dividing the sum by 2, and setting the obtained value as the pixel value of the selected interference-fringe image 123. The image selection unit 103 does not select, as a selected interference-fringe image 123, the two first and last interference-fringe images 34 that have not been used for the combination as indicated by × marks, and discards the two first and last interference-fringe images 34. Also, the image selection unit 103 does not select, as a selected interference-fringe image 123, the interference-fringe images 34 whose determination results 121 indicate interference-fringe images 34L, and discards the interference-fringe images 34. The reason why the two first and last interference-fringe images 34 whose determination results 121 indicate the interference-fringe images 34K are discarded among the series of four interference-fringe images 34 is that the two first and last interference-fringe images 34 may be affected by the coherent light 23 from the previous emission position IP and the coherent light 23 from the next emission position IP.

FIG. 19 illustrates a state in which a selected interference-fringe image 123 is generated from two interference-fringe images 34 of frame numbers 02 and 03 among interference-fringe images 34 of frame numbers 01 to 04 output from the imaging element 22 when the coherent light 23 with the first set light quantity SLIK is emitted from the emission position IP11. Also, a state is illustrated in which a selected interference-fringe image 123 is generated from two interference-fringe images 34 of frame numbers 10 and 11 among interference-fringe images 34 of frame numbers 09 to 12 output from the imaging element 22 when the coherent light 23 with the first set light quantity SLIK is emitted from the emission position IP12. Also, FIG. 19 illustrates a state in which interference-fringe images 34 of frame numbers 05 to 08 output from the imaging element 22 when the coherent light 23 with the second set light quantity SLIL is emitted from the emission positions IP11, IP12, IP21, and IP22 are discarded. Also, a state is illustrated in which interference-fringe images 34 of frame numbers 13 to 16 output from the imaging element 22 when the coherent light 23 with the second set light quantity SLIL is emitted from the emission positions IP12, IP13, IP22, and IP23 are discarded.

The image selection unit 103 attaches information on an emission position IP to each selected interference-fringe image 123. The emission position IP can be recognized from the shot date and time and the determination result 121 of each interference-fringe image 34.

Figure 20:
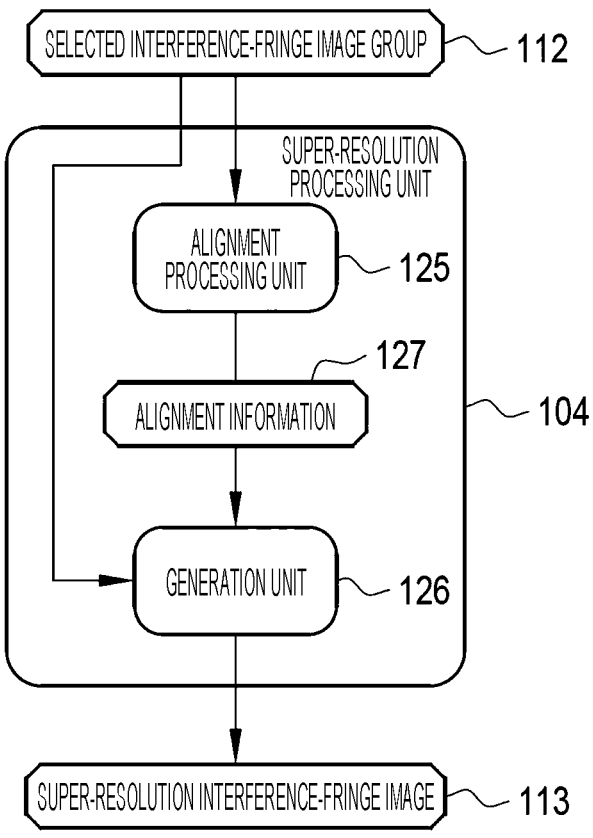
FIG. 20 is a diagram illustrating a super-resolution processing unit.

As illustrated in FIG. 20 as an example, the super-resolution processing unit 104 has an alignment processing unit 125 and a generation unit 126. The alignment processing unit 125 performs the alignment processing whose outline is illustrated in FIG. 9 on the plurality of selected interference-fringe images 123 constituting the selected interference-fringe image group 112. The alignment processing unit 125 outputs alignment information 127 that is a result of the alignment processing to the generation unit 126.

The generation unit 126 performs the reconstruction processing whose outline is illustrated in FIG. 9 on the plurality of selected interference-fringe images 123 constituting the selected interference-fringe image group 112 while referring to the alignment information 127. Accordingly, a super-resolution interference-fringe image 113 is generated.

Figure 21:
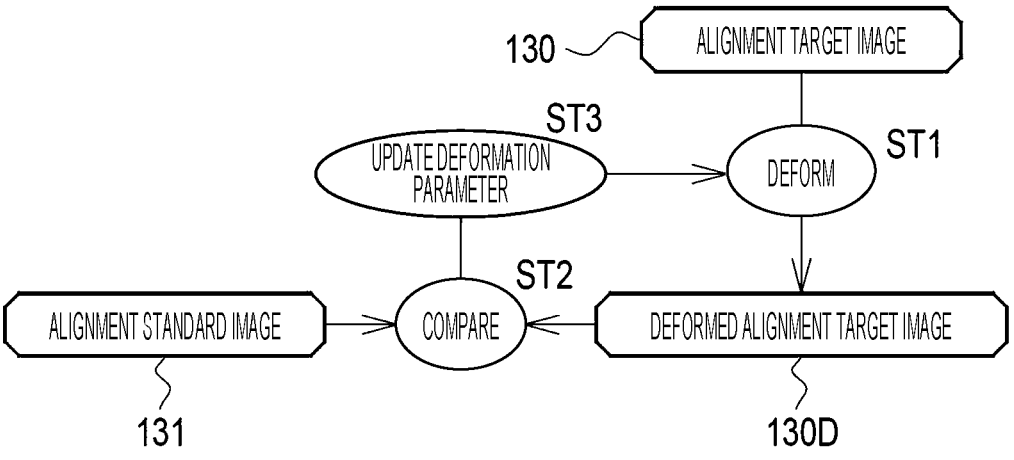
FIG. 21 is a diagram illustrating an example of details of alignment processing by an alignment processing unit.

FIG. 21 is a diagram illustrating an example of details of the alignment processing by the alignment processing unit 125. The alignment processing unit 125 performs the alignment processing by, for example, region-based matching. First, the alignment processing unit 125 applies various deformation parameters such as translation, rotation, and enlargement/reduction to an alignment target image 130 to deform the alignment target image 130, thereby obtaining a deformed alignment target image 130D (step ST1). Next, the deformed alignment target image 130D and an alignment standard image 131 are compared to each other, and a similarity therebetween is calculated (step ST2). Then, the deformation parameter is updated so that the similarity becomes higher (step ST3). The alignment processing unit 125 repeats the processing of these steps ST1 to ST3 until the similarity between the deformed alignment target image 130D and the alignment standard image 131 becomes equal to or more than a predetermined threshold value. The alignment processing unit 125 outputs the deformation parameter when the similarity between the deformed alignment target image 130D and the alignment standard image 131 is equal to or more than the threshold value to the generation unit 126 as alignment information 127.

The alignment standard image 131 is one of the plurality of selected interference-fringe images 123 constituting the selected interference-fringe image group 112, and the alignment target image 130 is the selected interference-fringe image 123 other than the alignment standard image 131. The alignment standard image 131 is, for example, a selected interference-fringe image 123 obtained when the coherent light 23 is emitted from the light emitting unit 41 at the emission position IP33 that is the center of the emission positions IP.

Figure 22:
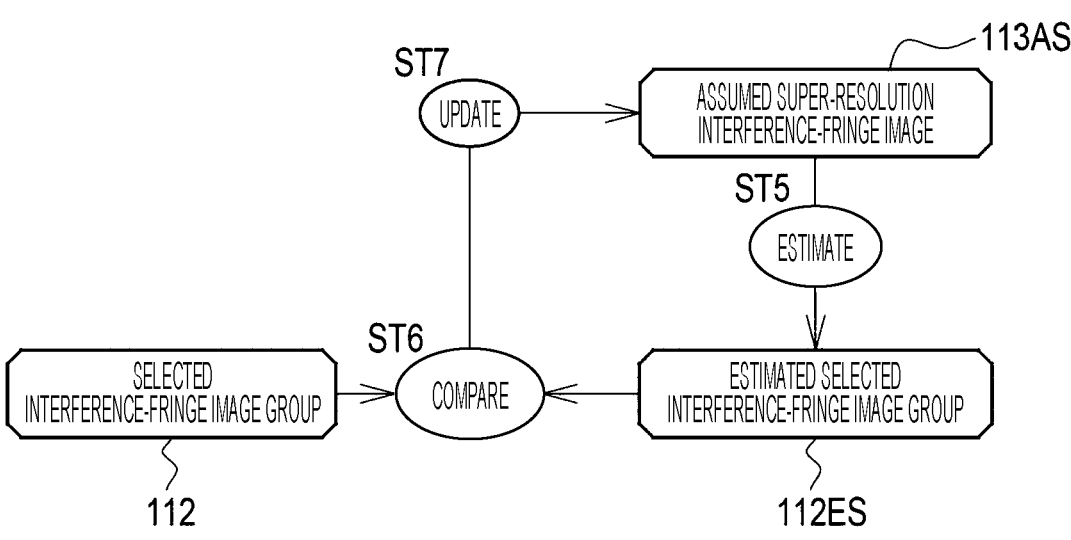
FIG. 22 is a diagram illustrating an example of details of reconstruction processing by a generation unit.

FIG. 22 is a diagram illustrating an example of details of the reconstruction processing by the generation unit 126. The generation unit 126 performs, for example, the reconstruction processing by maximum a posteriori (MAP) estimation. First, the generation unit 126 generates an appropriate assumed super-resolution interference-fringe image

113AS, and generates an estimated selected interference-fringe image group 112ES from the assumed super-resolution interference-fringe image 113AS based on a point spread function (PSF) of the imaging element 22, the alignment information 127, and the like (step ST5). Next, the estimated selected interference-fringe image group 112ES is compared to an actual selected interference-fringe image group 112 (step ST6). Then, the assumed super-resolution interference-fringe image 113AS is updated so that the difference between the estimated selected interference-fringe image group 112ES and the actual selected interference-fringe image group 112 becomes small (step ST7). The generation unit 126 repeats the processing of these steps ST5 to ST7 until the difference between the estimated selected interference-fringe image group 112ES and the actual selected interference-fringe image group 112 becomes less than a predetermined threshold value. The generation unit 126 outputs the assumed super-resolution interference-fringe image 113AS when the difference between the estimated selected interference-fringe image group 112ES and the actual selected interference-fringe image group 112 is less than the threshold value, as a final super-resolution interference-fringe image 113.

Figure 23:
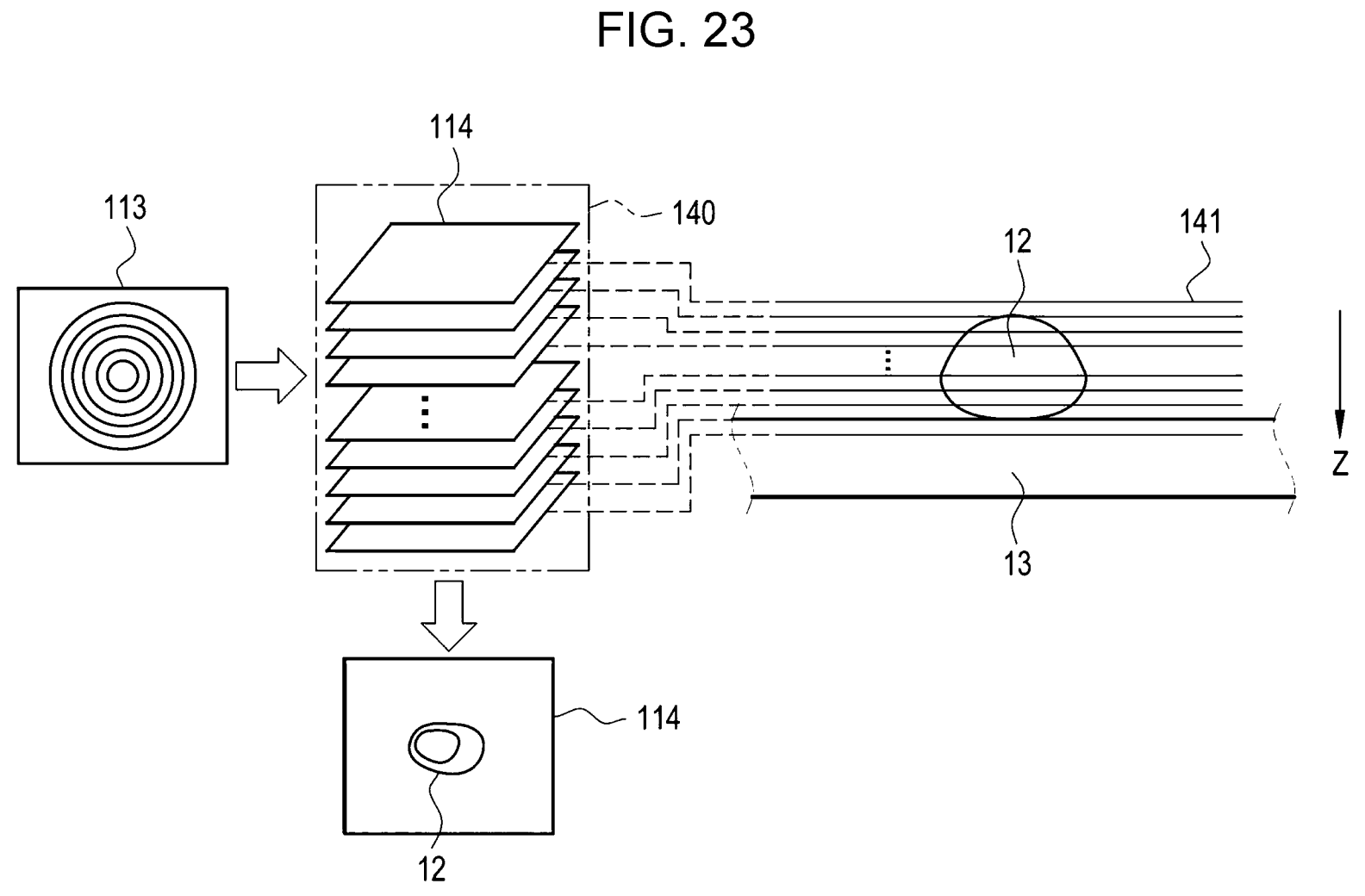

FIG. 23 is a diagram illustrating an example of an outline of arithmetic processing by the reconstruction processing unit 105. The reconstruction processing unit 105 first reconstructs the super-resolution interference-fringe image 113 to generate a reconstructed image 114. A reconstructed image group 140 is a collection of a plurality of reconstructed images 114. Each of the plurality of reconstructed images 114 is an image representing each of tomographic planes 141 arranged at equal intervals in the thickness direction of the cell 12 and the culture container 13 along the Z direction.

The reconstruction processing unit 105 selects one most focused reconstructed image 114 from among the plurality of reconstructed images 114 of the reconstructed image group 140. The reconstruction processing unit 105 outputs the selected reconstructed image 114 to the display control unit 106. Note that, as a method of selecting the most focused reconstructed image 114, a method of calculating a contrast value of each of the plurality of reconstructed images 114 and selecting the reconstructed image 114 having the highest contrast value as the most focused reconstructed image 114, or the like, can be employed.

Figure 24:
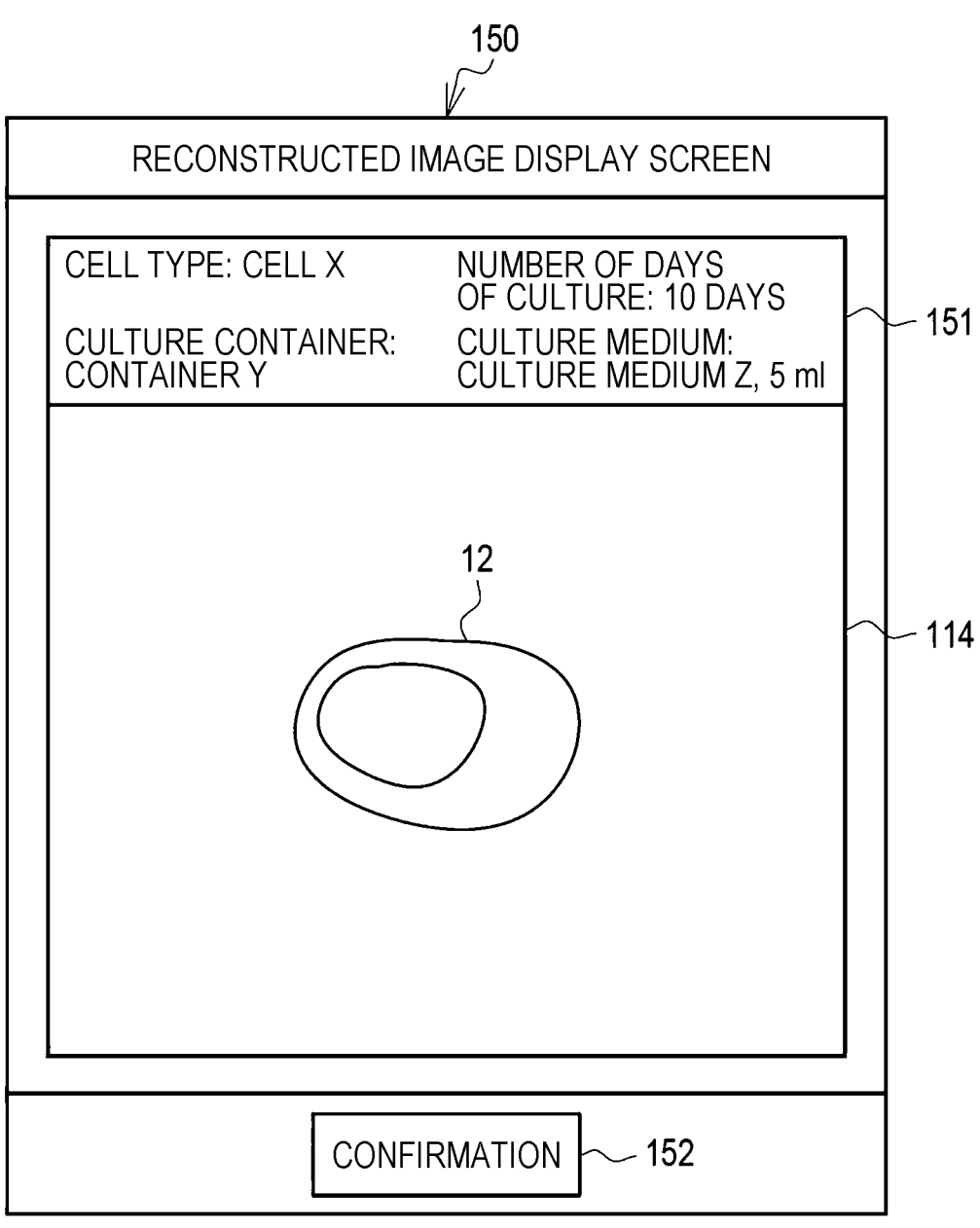
FIG. 24 is a view illustrating a reconstructed image display screen.

As illustrated in FIG. 24 as an example, the reconstructed image 114 is displayed together with attribute information 151 on the reconstructed image display screen 150. The attribute information 151 includes the type of the cell 12, the number of days of culture of the cell 12, the type of the culture container 13, and the type and the use amount of the culture medium. The display of the reconstructed image display screen 150 disappears when a confirmation button 152 is selected. The reconstructed image 114 may be stored in the storage 80 in accordance with an operation instruction of the user.

Next, an operation by the above-described configuration will be described with reference to flowcharts presented in FIG. 25 and FIG. 26 as an example. When the operating program 60 is activated in the imaging apparatus 10, as illustrated in FIG. 11, the CPU 52 of the imaging apparatus 10 functions as the light source control unit 65, the imaging control unit 66, and the transmission control unit 67.

Figure 25:
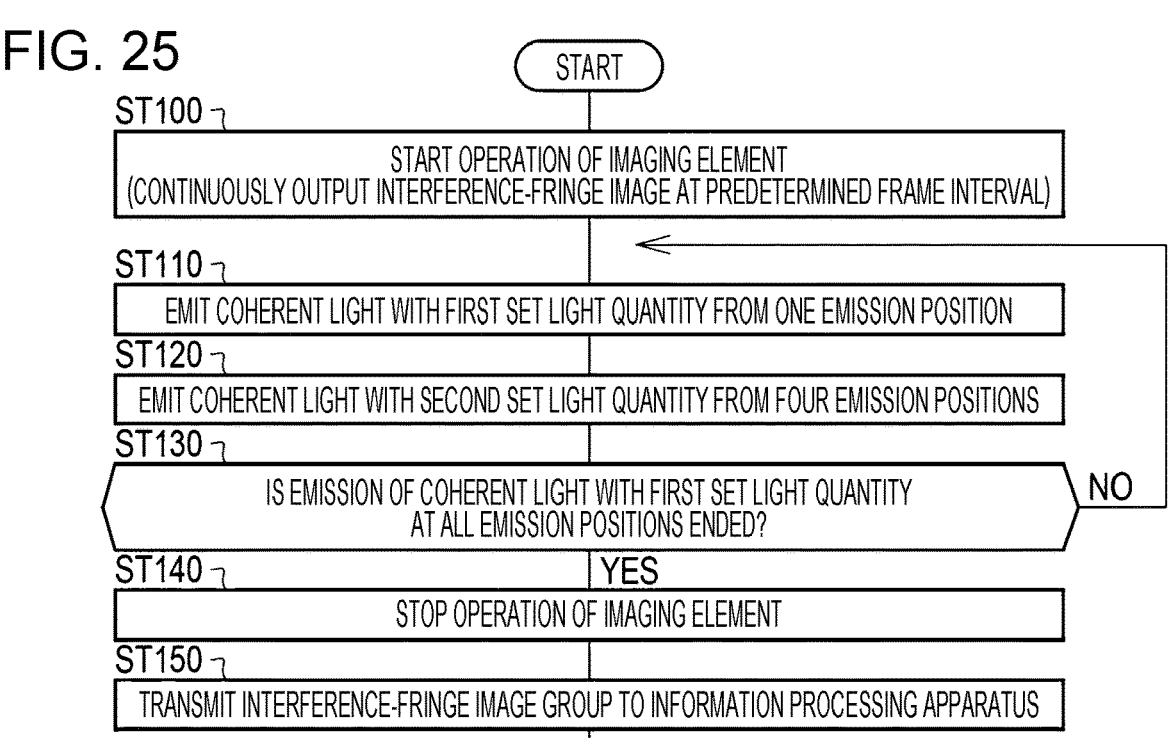
FIG. 25 is a flowchart presenting a processing procedure of the imaging apparatus.

In FIG. 25, when the shooting start instruction of the interference-fringe image 34 has been input, as illustrated in FIGS. 12 and 13, the operation of the imaging element 22 is started under the control of the imaging control unit 66, and the interference-fringe image 34 is continuously output from the imaging element 22 at the predetermined frame interval FS (step ST100). Then, under the control of the light source control unit 65, the coherent light 23 with the first set light quantity SLIK is emitted from the light emitting unit 41 at one emission position IP (step ST110). Subsequently, the coherent light 23 with the second set light quantity SLIL is emitted from the light emitting units 41 at four emission positions IP (step ST120). The processing of these steps ST110 and ST120 is repeated such that the emission positions IP are sequentially switched while the emission of the coherent light 23 with the first set light quantity SLIK at all the emission positions IP is not ended (NO in step ST130). During this processing, a plurality of interference-fringe images 34 are sequentially output from the imaging element 22 at the frame interval FS.

When the emission of the coherent light 23 with the first set light quantity SLIK at all the emission positions IP has been ended (YES in step ST130), the operation of the imaging element 22 is stopped under the control of the imaging control unit 66 (step ST140). Then, the transmission control unit 67 transmits the interference-fringe image group 69 to the information processing apparatus 11 (step ST150).

When the operating program 90 is activated in the information processing apparatus 11, as illustrated in FIG. 16, the CPU 82 of the information processing apparatus 11 functions as the RW control unit 100, the luminance calculation unit 101, the determination unit 102, the image selection unit 103, the super-resolution processing unit 104, the reconstruction processing unit 105, and the display control unit 106.

The information processing apparatus 11 receives the interference-fringe image group 69 from the imaging apparatus 10. The interference-fringe image group 69 is stored in the storage 80 by the RW control unit 100.

Figure 26:
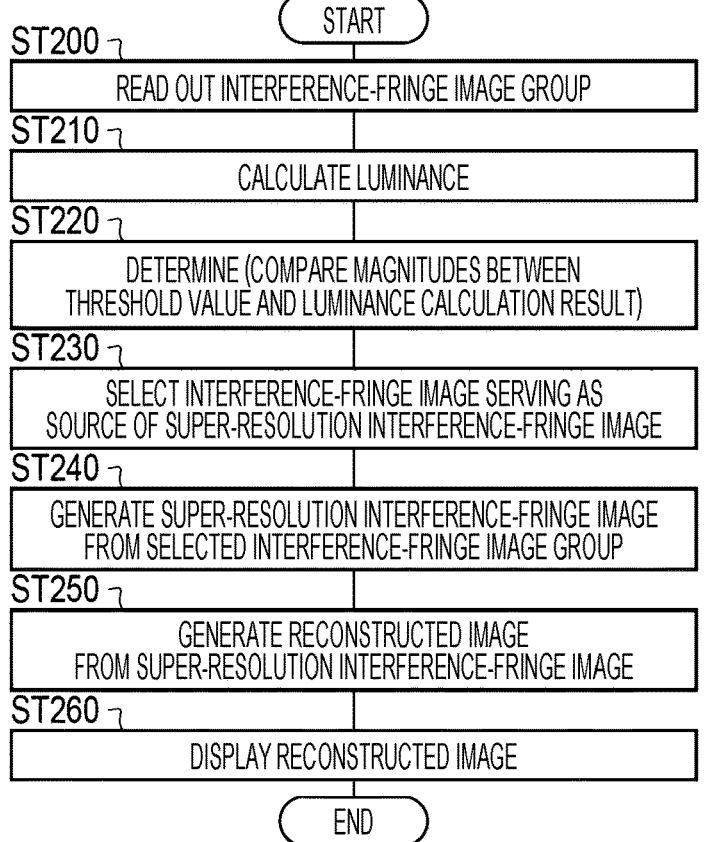
FIG. 26 is a flowchart presenting a processing procedure of the information processing apparatus.

In FIG. 26, the RW control unit 100 reads out the interference-fringe image group 69 from the storage 80 (step ST200). The interference-fringe image group 69 is output from the RW control unit 100 to the luminance calculation unit 101 and the image selection unit 103.

The luminance calculation unit 101 calculates a representative value of the luminance of each of the plurality of interference-fringe images 34 constituting the interference-fringe image group 69 (step ST210). Then, a luminance calculation result group 110 that is a collection of luminance calculation results 120 is output from the luminance calculation unit 101 to the determination unit 102.

As illustrated in FIGS. 17 and 18, the determination unit 102 compares the magnitudes between the threshold value 91 and the luminance calculation result 120 to determine whether the interference-fringe image 34 is the interference-fringe image 34K or the interference-fringe image 34L (step ST220). Then, a determination result group 111 that is a collection of determination results 121 is output from the determination unit 102 to the image selection unit 103.

As illustrated in FIG. 19, the image selection unit 103 selects an interference-fringe image 34 determined as the interference-fringe image 34K by the determination unit 102 as an interference-fringe image 34 serving as a source of a super-resolution interference-fringe image 113, that is, a selected interference-fringe image 123 (step ST230). Then, a selected interference-fringe image group 112 that is a collection of selected interference-fringe images 123 is output from the image selection unit 103 to the super-resolution processing unit 104.

As illustrated in FIGS. 20 to 22, the super-resolution processing unit 104 performs the alignment processing and the reconstruction processing, and a super-resolution interference-fringe image 113 is generated from the selected interference-fringe image group 112 (step ST240). The super-resolution interference-fringe image 113 is output from the super-resolution processing unit 104 to the reconstruction processing unit 105.

As illustrated in FIG. 23, the reconstruction processing unit 105 generates a reconstructed image 114 from the super-resolution interference-fringe image 113 (step ST250). The reconstructed image 114 is output from the reconstruction processing unit 105 to the display control unit 106. Then, as illustrated in FIG. 24, under the control of the display control unit 106, the reconstructed image display screen 150 is displayed on the display 84, and the reconstructed image 114 is provided for viewing by the user (step ST260).

As described above, the light source control unit 65 in the CPU 52 of the imaging apparatus 10 controls the operation of the light source 20. The light source 20 irradiates the cell 12 with the coherent light 23 to generate interference fringes 33 of the cell 12. Also, the light source 20 has a configuration in which the plurality of light emitting units 41 of the coherent light 23 are arranged at the plurality of emission positions IP. The light source control unit 65 performs control of causing the coherent light 23 with the first set light quantity SLIK to be emitted from the plurality of emission positions IP one by one to obtain a plurality of interference-fringe images 34 (selected interference-fringe images 123) serving as a source of a super-resolution interference-fringe image 113 with a resolution exceeding the resolution of the imaging element 22 that picks up an image of the interference fringes 33. Also, the light source control unit 65 performs control of setting the light quantity of the coherent light 23 to the second set light quantity SLIL different from the first set light quantity SLIK during switching from the current emission position IP to the next emission position IP. More specifically, the light source control unit 65 causes the coherent light 23 to be simultaneously emitted at the four emission positions IP during switching from the current emission position IP to the next emission position IP, thereby setting the light quantity of the coherent light 23 to the second set light quantity SLIL. Thus, it is possible to easily determine that the emission position IP of the coherent light 23 has been switched from the interference-fringe image 34. As a result, it is possible to smoothly proceed with the generation of the super-resolution interference-fringe image 113.

The light source 20 is a VCSEL. The VCSEL is very popular as a light source in which a plurality of light emitting units 41 are arranged at equal intervals in the X direction and the Y direction, and is relatively inexpensive and easy to control. Thus, by using the VCSEL as the light source 20, it is possible to reduce the manufacturing cost of the imaging apparatus 10.

The field of cell culture has been spotlighted recently with the advent of iPS cells and the like. Thus, there is a demand for a technology of analyzing cells 12 being cultured in detail with as little trouble as possible. In the technology of the present disclosure, the observation target object is a cell 12 being cultured. Thus, it can be said that the technology of the present disclosure is a technology capable of responding to recent demands.

The illumination light of the light source 20 is coherent light 23. Thus, it is possible to generate interference fringes 33 in which the difference between the bright portion 36 and the dark portion 38 is clearer. As a result, the image quality of the reconstructed image 114 can be improved.

Figure 27:
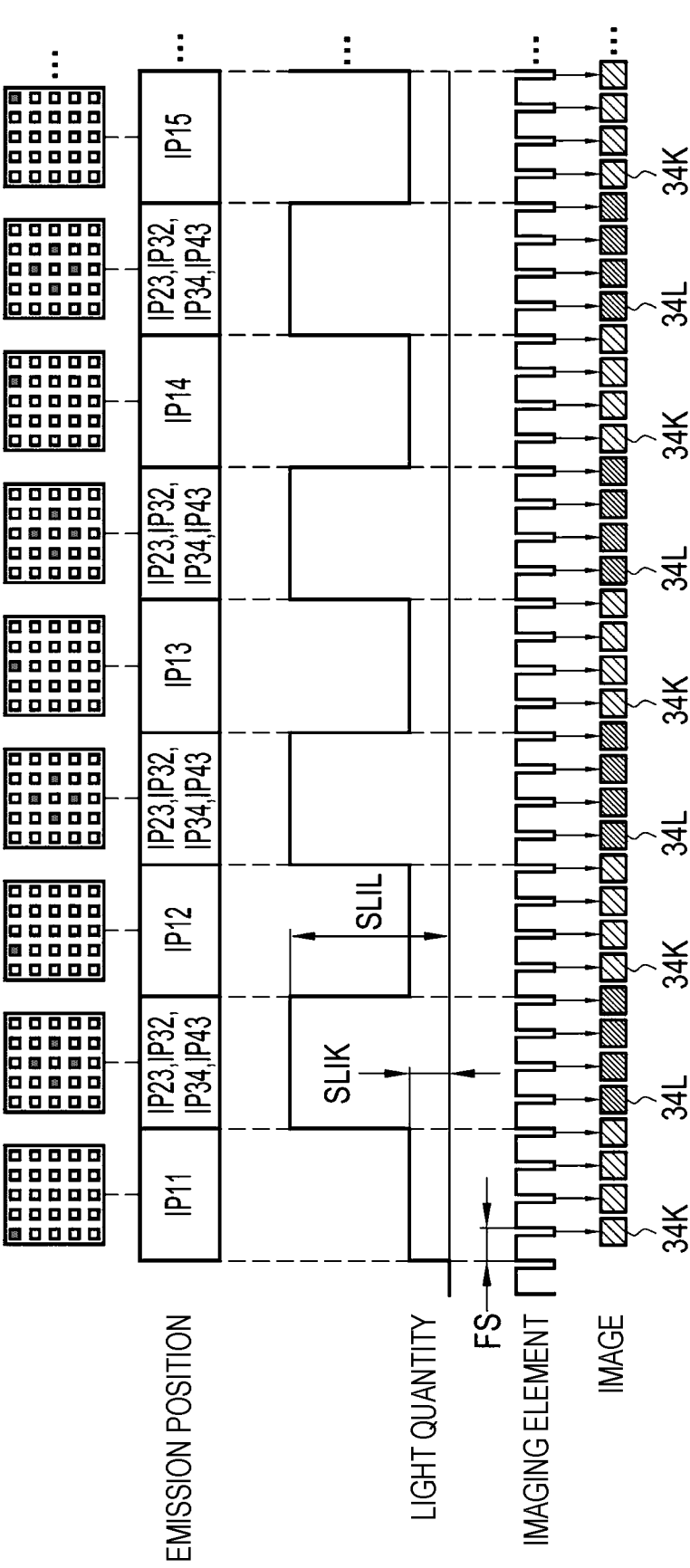
FIG. 27 is a diagram illustrating another example of emission positions when the coherent light with the second set light quantity is emitted.

In the example illustrated in FIGS. 12 to 14, the coherent light 23 with the second set light quantity SLIL is emitted while the four emission positions IP are sequentially shifted in accordance with the one emission position IP; however, the present disclosure is not limited thereto. As illustrated in FIG. 27 as an example, the coherent light 23 may be simultaneously emitted from four emission positions IP23, IP32, IP34, and IP43 surrounding the upper, lower, left, and right sides of the emission position IP33 that is the center of the emission positions IP to emit the coherent light 23 with the second set light quantity SLIL. Since it is sufficient to cause the light emitting unit 41 at the same emission position IP to emit light at all times when the coherent light 23 with the second set light quantity SLIL is emitted, the control is simple.

Note that the emission positions IP when the coherent light 23 with the second set light quantity SLIL is emitted are not limited to the exemplified four positions. The number of positions may be two, three, or five or more. The light emitting units 41 at all the emission positions IP may be caused to emit light. When the light emitting units 41 at all the emission positions IP are caused to emit light, the control is the simplest.

Figure 28:
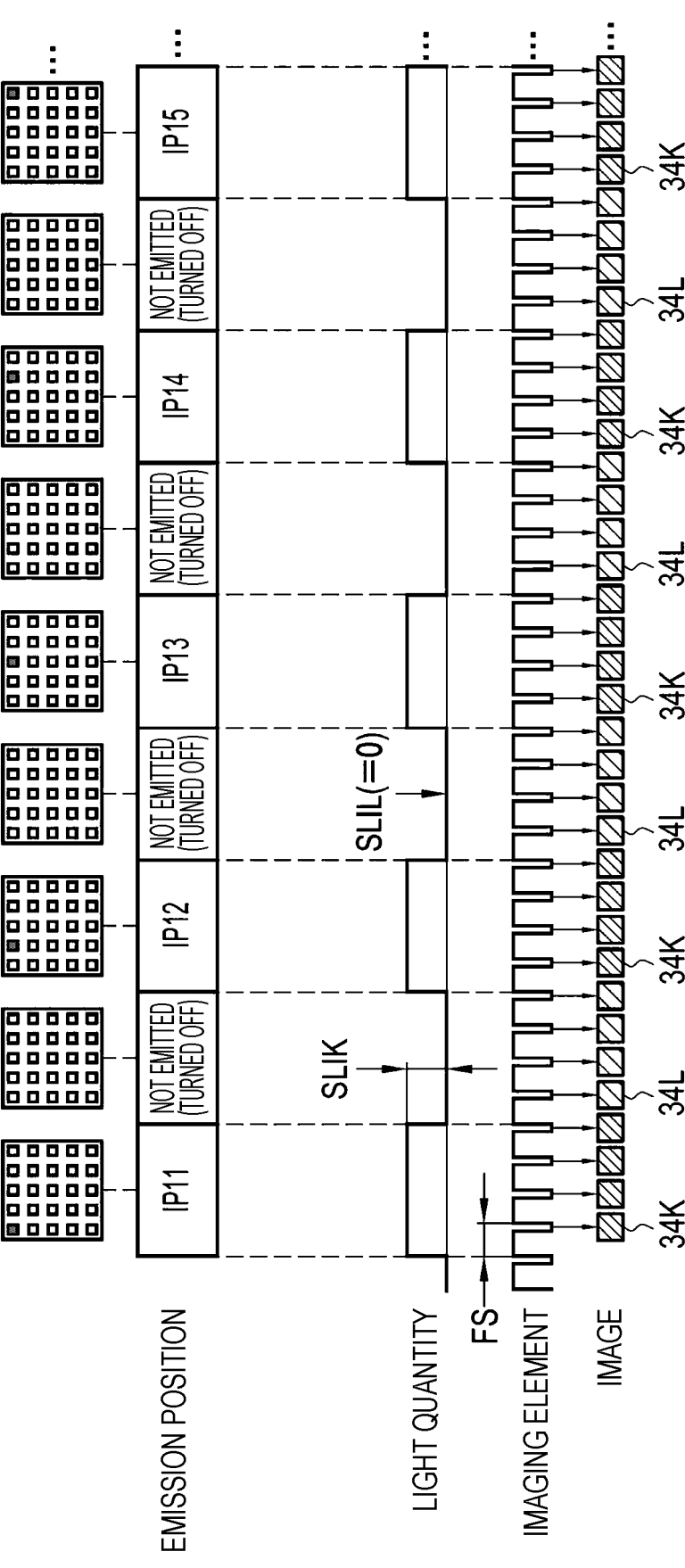
FIG. 28 is a diagram illustrating an aspect in which the coherent light is not emitted during switching from the current emission position to the next emission position.

Also, the second set light quantity SLIL may be lower than the first set light quantity SLIK. As illustrated in FIG. 28 as an example, the light quantity of the coherent light 23 may be set to the second set light quantity SLIL (=0) by not emitting (turning off) the coherent light 23 during switching from the current emission position IP to the next emission position IP. Since it is sufficient to turn off the light source 20 when the light quantity is set to the second set light quantity SLIL, the control is simple. Also, it is possible to suppress power consumption as compared to the case where the coherent light 23 is simultaneously emitted at the four emission positions IP during switching from the current emission position IP to the next emission position IP.

Embodiment 2-1

In Embodiment 2-1 illustrated in FIGS. 29 to 33, the coherent light 23 is emitted at a separate emission position IPFA during switching from the current emission position IP to the next emission position IP.

Figure 29:
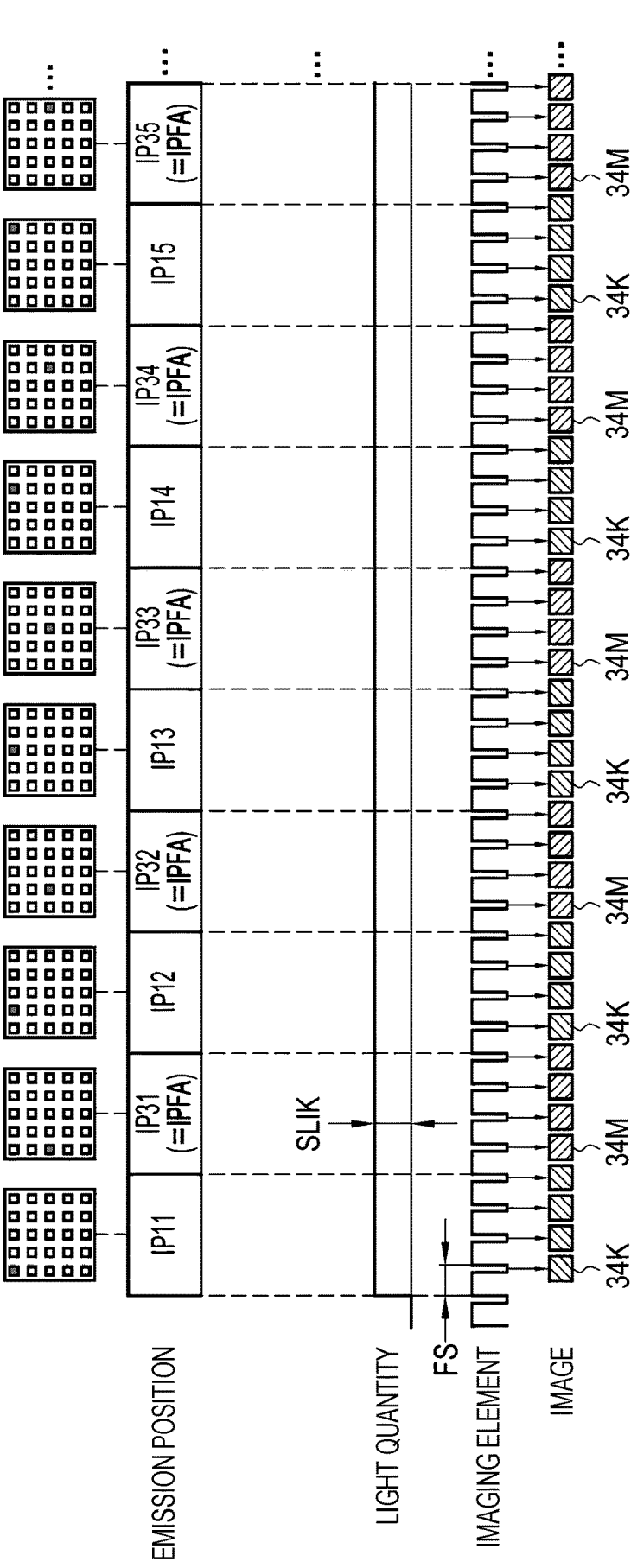
FIG. 29 is a timing chart illustrating a state of operation control of a light source by a light source control unit and operation control of an imaging element by an imaging control unit according to Embodiment 2-1.
Figure 30:
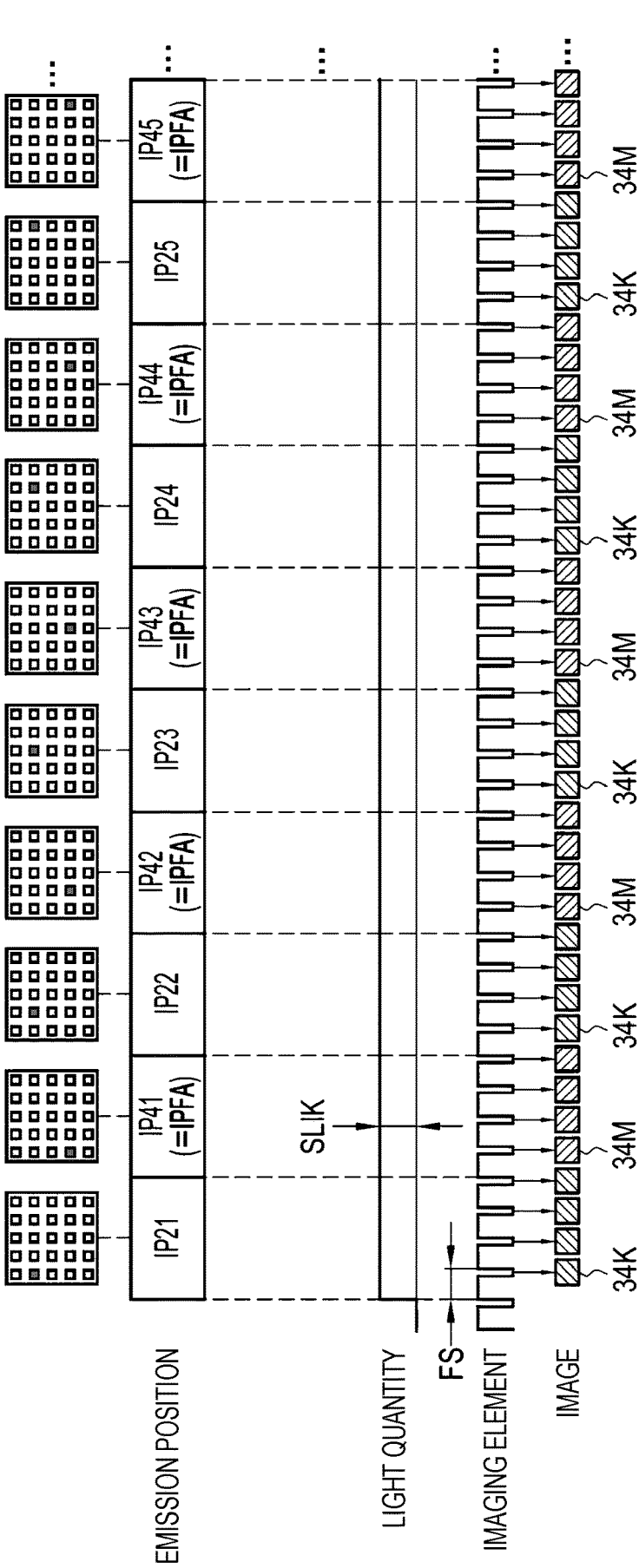
FIG. 30 is a timing chart illustrating a state of the operation control of the light source by the light source control unit and the operation control of the imaging element by the imaging control unit according to Embodiment 2-1.
Figure 31:
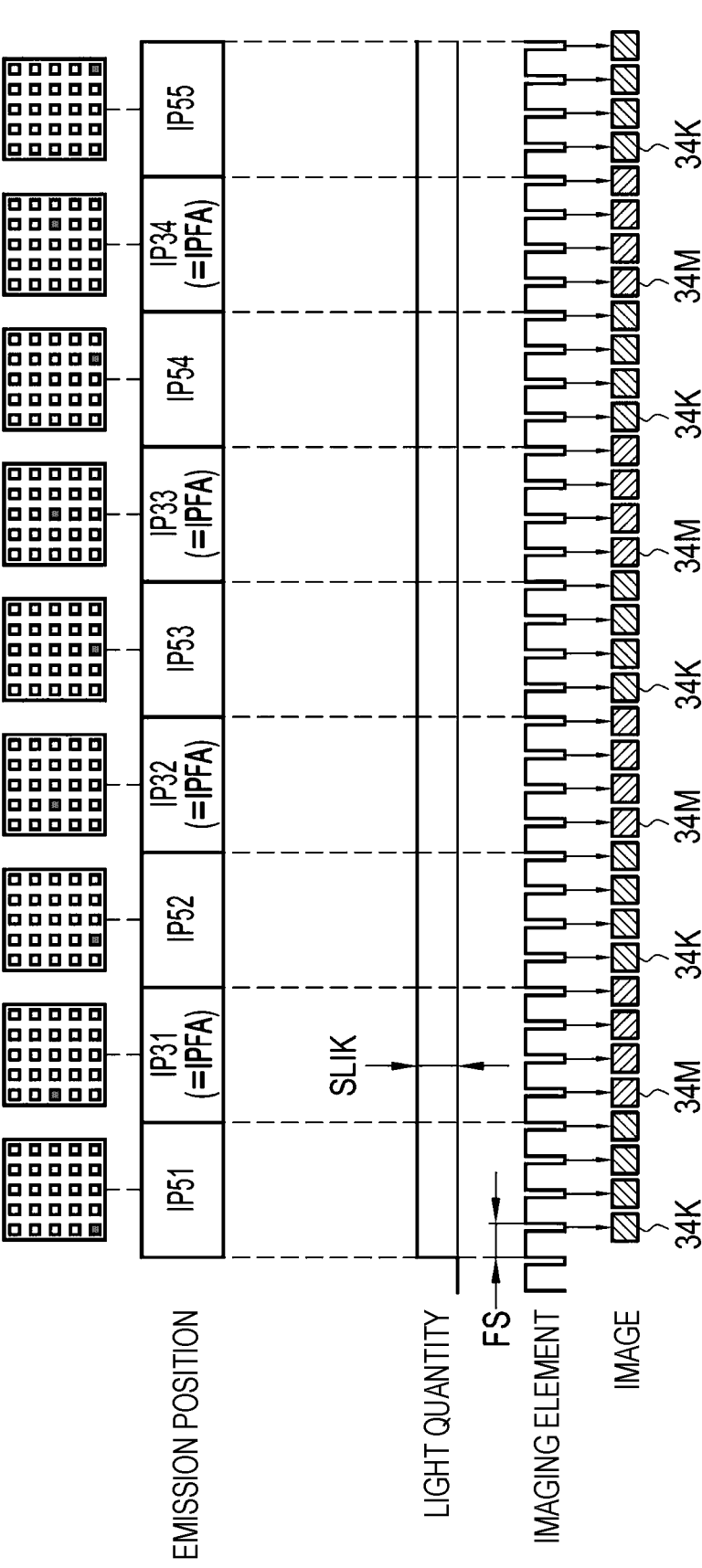
FIG. 31 is a timing chart illustrating a state of the operation control of the light source by the light source control unit and the operation control of the imaging element by the imaging control unit according to Embodiment 2-1.

As illustrated in FIGS. 29, 30, 31, and Tables 200 in FIG. 32 as an example, when the shooting start instruction of the interference-fringe image 34 is input, the light source control unit 65 performs control of causing the coherent light 23 with the first set light quantity SLIK to be emitted from the emission positions IP11 to IP55 sequentially one by one. Also, the light source control unit 65 performs control of causing the coherent light 23 with the first set light quantity SLIK to be emitted at a separate emission position IPFA during switching from the current emission position IP to the next emission position IP. The separate emission position IPFA is an emission position IP separated by at least one emission position IP from both the current emission position IP and the next emission position IP. The emission time of the coherent light 23 at the separate emission position IPFA is the same as the emission time of the coherent light 23 with the first set light quantity SLIK from each of the emission positions IP11 to IP55.

The separate emission position IPFA in the present example is a position separated from the current emission position IP and the next emission position IP by two positions in the Y direction and separated from the next emission position IP by one position in the X direction. For example, the separate emission position IPFA between the current emission position IP11 and the next emission position IP12 is the emission position IP31. Also, the separate emission position IPFA is a position separated from the current emission position IP by two positions in the Y direction, and separated from the next emission position IP by four positions in the X direction and by one position in the Y direction. For example, the separate emission position IPFA between the current emission position IP15 and the next emission position IP21 is the emission position IP35. Note that the separate emission position IPFA is not limited to the emission position IP exemplified above as long as the separate emission position IPFA is an emission position IP separated by at least one emission position IP from both the current emission position IP and the next emission position IP.

Similarly to Embodiment 1 described above, the imaging control unit 66 starts the operation of the imaging element 22 before the start of the emission of the coherent light 23 at the emission position IP11. Then, the imaging element 22 is caused to perform so-called motion picture shooting in which the interference-fringe image 34 is continuously output at the predetermined frame interval FS. Note that, hereinafter, the interference-fringe image 34 output from the imaging element 22 when the coherent light 23 is emitted from the separate emission position IPFA is referred to as an interference-fringe image 34M for convenience.

FIG. 29 illustrates a transition from the emission position IP11 to the emission position IP15. First, the light source control unit 65 causes the coherent light 23 with the first set light quantity SLIK to be emitted from the emission position IP11. During this period, the imaging control unit 66 causes the imaging element 22 to output four interference-fringe images 34K. Subsequently, the light source control unit 65 causes the coherent light 23 with the first set light quantity SLIK to be emitted from the emission position IP31 that is the separate emission position IPFA. During this period, the imaging control unit 66 causes the imaging element 22 to output four interference-fringe images 34M. Then, the light source control unit 65 causes the coherent light 23 with the first set light quantity SLIK to be emitted from the emission position IP12. During this period, the imaging control unit 66 causes the imaging element 22 to output four interference-fringe images 34K. Subsequently, the light source control unit 65 causes the coherent light 23 with the first set light quantity SLIK to be emitted from the emission position IP32 that is the separate emission position IPFA. During this period, the imaging control unit 66 causes the imaging element 22 to output four interference-fringe images 34M. Thereafter, the light source control unit 65 and the imaging control unit 66 perform similar control.

FIG. 30 illustrates a transition from the emission position IP21 to the emission position IP25. The light source control unit 65 causes the coherent light 23 with the first set light quantity SLIK to be emitted from the emission position IP21. During this period, the imaging control unit 66 causes the imaging element 22 to output four interference-fringe images 34K. Subsequently, the light source control unit 65 causes the coherent light 23 with the first set light quantity SLIK to be emitted from the emission position IP41 that is the separate emission position IPFA. During this period, the imaging control unit 66 causes the imaging element 22 to output four interference-fringe images 34M. Then, the light source control unit 65 causes the coherent light 23 with the first set light quantity SLIK to be emitted from the emission position IP22. During this period, the imaging control unit 66 causes the imaging element 22 to output four interference-fringe images 34K. Subsequently, the light source control unit 65 causes the coherent light 23 with the first set light quantity SLIK to be emitted from the emission position IP42 that is the separate emission position IPFA. During this period, the imaging control unit 66 causes the imaging element 22 to output four interference-fringe images 34M. Thereafter, the light source control unit 65 and the imaging control unit 66 perform similar control.

FIG. 31 illustrates a transition from the emission position IP51 to the emission position IP55. The light source control unit 65 causes the coherent light 23 with the first set light quantity SLIK to be emitted from the emission position IP51. During this period, the imaging control unit 66 causes the imaging element 22 to output four interference-fringe images 34K. Subsequently, the light source control unit 65 causes the coherent light 23 with the first set light quantity SLIK to be emitted from the emission position IP31 that is the separate emission position IPFA. During this period, the imaging control unit 66 causes the imaging element 22 to output four interference-fringe images 34M. Then, the light source control unit 65 causes the coherent light 23 with the first set light quantity SLIK to be emitted from the emission position IP52. During this period, the imaging control unit 66 causes the imaging element 22 to output four interference-fringe images 34K. Subsequently, the light source control unit 65 causes the coherent light 23 with the first set light quantity SLIK to be emitted from the emission position IP32 that is the separate emission position IPFA. During this period, the imaging control unit 66 causes the imaging element 22 to output four interference-fringe images 34M. Thereafter, the light source control unit 65 and the imaging control unit 66 perform similar control. Then, finally, the coherent light 23 with the first set light quantity SLIK is emitted from the emission position IP55, and four interference-fringe images 34K are output from the imaging element 22. Thus, a plurality of interference-fringe images 34 (a plurality of interference-fringe images 34K and a plurality of interference-fringe images 34M) are obtained. An interference-fringe image group 69 is constituted of the plurality of interference-fringe images 34.

Table 200 in FIG. 32 summarizes the current emission position IP, the next emission position IP, and the separate emission position IPFA. For example, when the current emission position IP is IP35, the separate emission position IPFA is the emission position IP55. Also, for example, when the current emission position IP is IP44, the separate emission position IPFA is the emission position IP24.

In this case, the luminance calculation unit 101 calculates representative values of the luminance of a plurality of regions obtained by equally dividing the interference-fringe image 34 into, for example, 5×5=25 of regions. The storage 80 stores, for each emission position IP, a luminance distribution in which a representative value of the luminance of each region of the interference-fringe image 34 is registered, instead of the threshold value 91. The determination unit 102 calculates the degree of coincidence between the representative value of the luminance calculated by the luminance calculation unit 101 and the luminance distribution stored in the storage 80. Then, based on the calculated degree of coincidence, it is determined whether the interference-fringe image 34 is the interference-fringe image 34K or the interference-fringe image 34M.

Figure 33:
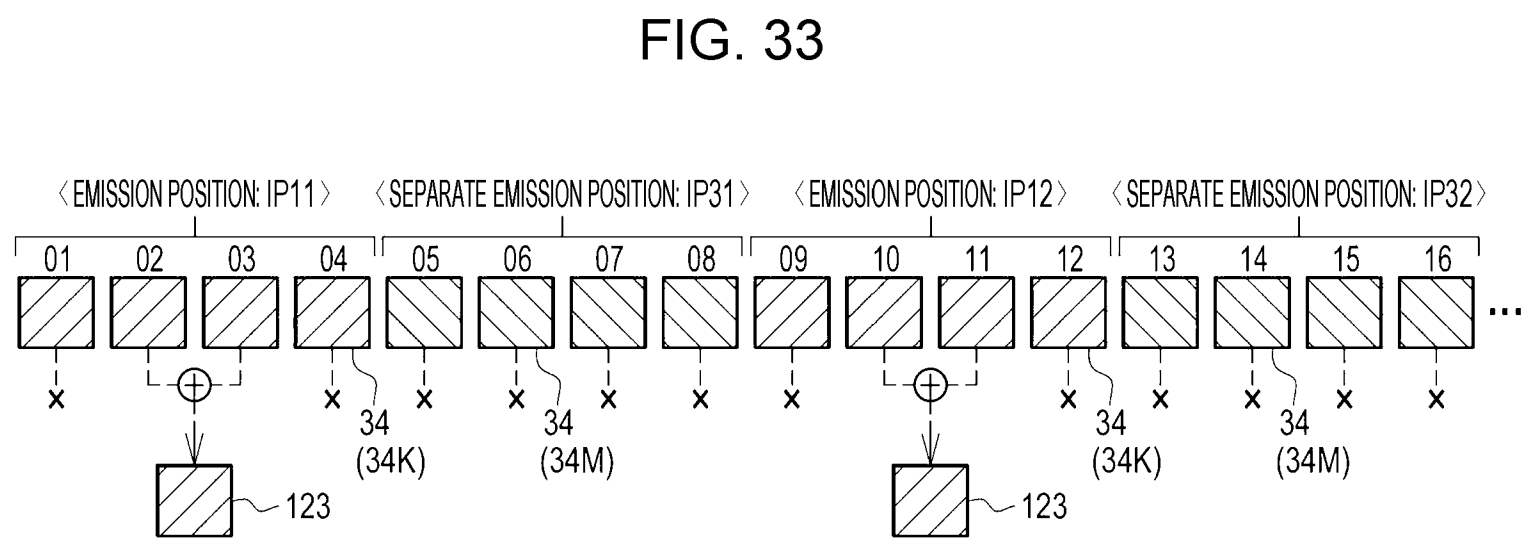

As illustrated in FIG. 33 as an example, similarly to Embodiment 1 described above, the image selection unit 103 generates a selected interference-fringe image 123 by combining two intermediate interference-fringe images 34 interposed between two first and last interference-fringe images 34 among a series of four interference-fringe images 34 whose determination results 121 indicate interference-fringe images 34K. Also, the image selection unit 103 does not select, as a selected interference-fringe image 123, the two first and last interference-fringe images 34 that have not been used for the combination as indicated by x marks, and discards the two first and last interference-fringe images 34. Also, the image selection unit 103 does not select, as a selected interference-fringe image 123, the interference-fringe images 34 whose determination results 121 indicate interference-fringe images 34M, and discards the interference-fringe images 34.

FIG. 33 illustrates a state in which a selected interference-fringe image 123 is generated from two interference-fringe images 34 of frame numbers 02 and 03 among interference-fringe images 34 of frame numbers 01 to 04 output from the imaging element 22 when the coherent light 23 with the first set light quantity SLIK is emitted from the emission position IP11. Also, a state is illustrated in which a selected interference-fringe image 123 is generated from two interference-fringe images 34 of frame numbers 10 and 11 among interference-fringe images 34 of frame numbers 09 to 12 output from the imaging element 22 when the coherent light 23 with the first set light quantity SLIK is emitted from the emission position IP12. Also, FIG. 33 illustrates a state in which interference-fringe images 34 of frame numbers 05 to 08 and 13 to 16 output from the imaging element 22 when the coherent light 23 with the first set light quantity SLIK is emitted from the emission positions IP31 and IP32 that are the separate emission positions IPFA are discarded.

As described above, in Embodiment 2-1, the light source control unit 65 performs the control of causing the coherent light 23 to be emitted at the separate emission position IPFA separated by at least one emission position IP from both the current emission position IP and the next emission position IP during switching from the current emission position IP to the next emission position IP. With this aspect as well, it is possible to easily determine that the emission position IP of the coherent light 23 has been switched from the interference-fringe image 34, and consequently it is possible to smoothly proceed with the generation of the super-resolution interference-fringe image 113. Also, it is possible to suppress power consumption as compared to the case where the coherent light 23 is simultaneously emitted at least two emission positions IP during switching from the current emission position IP to the next emission position IP.

Embodiment 2-2

Although the interference-fringe image 34M obtained at the separate emission position IPFA is discarded in Embodiment 2-1 described above, the present disclosure is not limited to this. As in Embodiment 2-2 illustrated in FIGS. 34 to 36 as an example, the interference-fringe image 34M obtained at the separate emission position IPFA may be used to generate the super-resolution interference-fringe image 113 without being discarded.

Table 210 in FIG. 34 summarizes the current emission position IP, the next emission position IP, and the separate emission position IPFA according to Embodiment 2-2. In Embodiment 2-2, since the interference-fringe image 34M obtained at the separate emission position IPFA is also used to generate the super-resolution interference-fringe image 113, the emission position IP once set as the separate emission position IPFA is not set as the current emission position IP. Specifically, the emission positions IP31 to IP35 set as the separate emission positions IPFA of the current emission positions IP11 to IP15, and the emission positions IP41 to IP45 set as the separate emission positions IPFA of the current emission positions IP21 to IP25 are not set as the current emission position IP. However, the emission positions IP31 to IP34 are set as the separate emission positions IPFA of the current emission positions IP11 to IP14, and are also set as the separate emission positions IPFA of the current emission positions IP51 to IP54.

Figure 35:
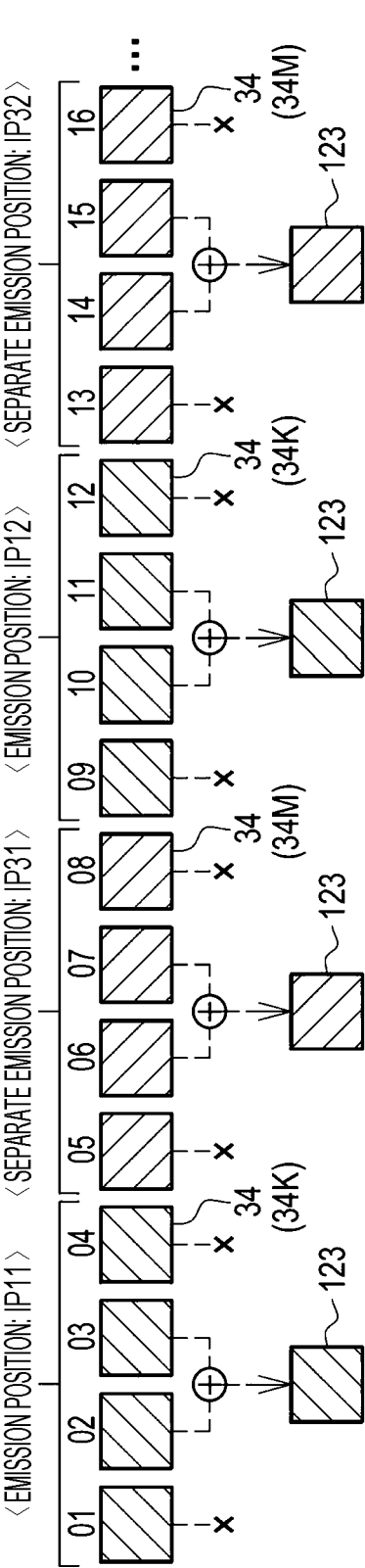
FIG. 35 is a diagram illustrating an outline of processing of an image selection unit according to Embodiment 2-2.

As illustrated in FIG. 35 as an example, similarly to each embodiment described above, the image selection unit 103 generates a selected interference-fringe image 123 by combining two intermediate interference-fringe images 34 interposed between two first and last interference-fringe images 34 among a series of four interference-fringe images 34 whose determination results 121 indicate interference-fringe images 34K. Also, the image selection unit 103 does not select, as a selected interference-fringe image 123, the two first and last interference-fringe images 34 that have not been used for the combination as indicated by × marks, and discards the two first and last interference-fringe images 34.

The image selection unit 103 generates a selected interference-fringe image 123 by combining two intermediate interference-fringe images 34 interposed between two first and last interference-fringe images 34 among a series of four interference-fringe images 34 whose determination results 121 indicate interference-fringe images 34M. Also, the image selection unit 103 does not select, as a selected interference-fringe image 123, the two first and last interference-fringe images 34 that have not been used for the combination as indicated by × marks, and discards the two first and last interference-fringe images 34.

FIG. 35 illustrates a state in which a selected interference-fringe image 123 is generated from two interference-fringe images 34 of frame numbers 02 and 03 among interference-fringe images 34 of frame numbers 01 to 04 output from the imaging element 22 when the coherent light 23 with the first set light quantity SLIK is emitted from the emission position IP11. Also, a state is illustrated in which a selected interference-fringe image 123 is generated from two interference-fringe images 34 of frame numbers 10 and 11 among interference-fringe images 34 of frame numbers 09 to 12 output from the imaging element 22 when the coherent light 23 with the first set light quantity SLIK is emitted from the emission position IP12. Also, FIG. 35 illustrates a state in which a selected interference-fringe image 123 is generated from two interference-fringe images 34 of frame numbers 06 and 07 among interference-fringe images 34 of frame numbers 05 to 08 output from the imaging element 22 when the coherent light 23 with the first set light quantity SLIK is emitted from the emission position IP31 that is the separate emission position IPFA. Also, a state is illustrated in which a selected interference-fringe image 123 is generated from two interference-fringe images 34 of frame numbers 14 and 15 among interference-fringe images 34 of frame numbers 13 to 16 output from the imaging element 22 when the coherent light 23 with the first set light quantity SLIK is emitted from the emission position IP32 that is the separate emission position IPFA.

Figure 36:
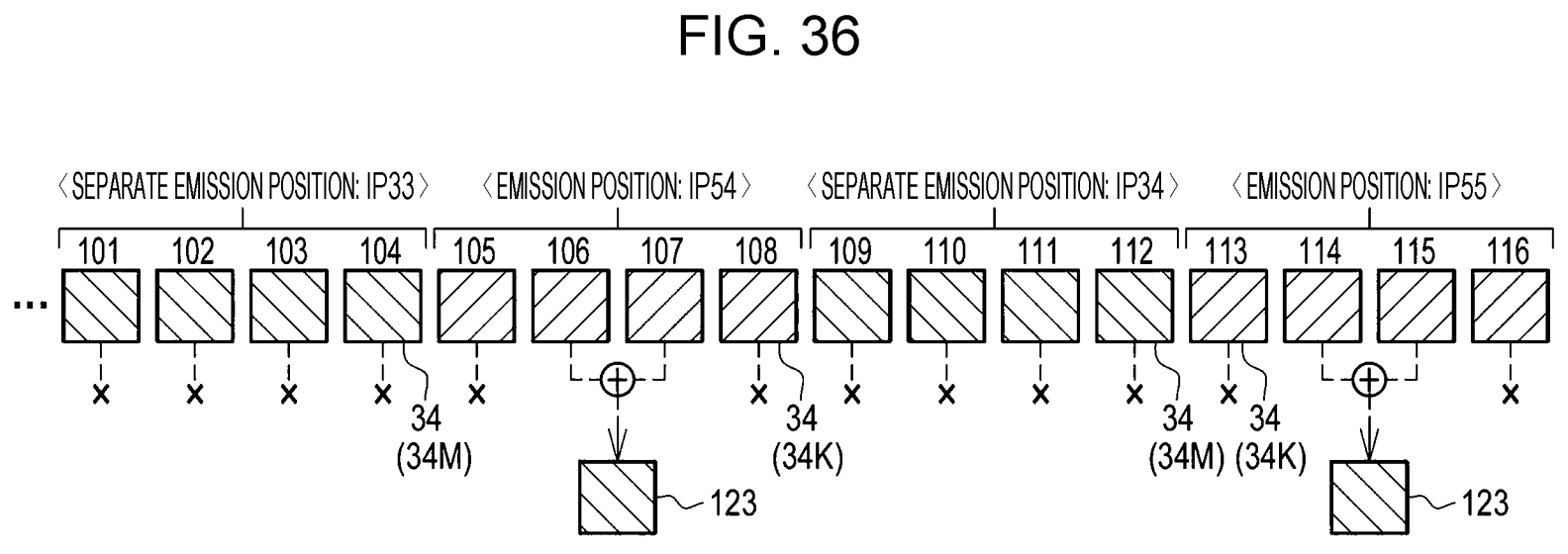

As illustrated in FIG. 36 as an example, the image selection unit 103 does not select, as a selected interference-fringe image 123, interference-fringe images 34M output from the imaging element 22 when the coherent light 23 with the first set light quantity SLIK is emitted for the second time from the emission positions IP31 to IP34 (only the emission positions IP33 and IP34 are illustrated in FIG. 36) as the separate emission positions IPFA as indicated by × marks, and discards the interference-fringe image 34M.

FIG. 36 illustrates a state in which a selected interference-fringe image 123 is generated from two interference-fringe images 34 of frame numbers 106 and 107 among interference-fringe images 34 of frame numbers 105 to 108 output from the imaging element 22 when the coherent light 23 with the first set light quantity SLIK is emitted from the emission position IP54. Also, a state is illustrated in which a selected interference-fringe image 123 is generated from two interference-fringe images 34 of frame numbers 114 and 115 among interference-fringe images 34 of frame numbers 113 to 116 output from the imaging element 22 when the coherent light 23 with the first set light quantity SLIK is emitted from the emission position IP55. Also, FIG. 36 illustrates a state in which interference-fringe images 34 of frame numbers 101 to 104 and 109 to 112 output from the imaging element 22 when the coherent light 23 with the first set light quantity SLIK is emitted from the emission positions IP33 and IP34 that are the separate emission positions IPFA are discarded.

As described above, in Embodiment 2-2, when the light source control unit 65 performs the control of causing the coherent light 23 to be emitted at the separate emission position IPFA during switching from the current emission position IP to the next emission position IP, the interference-fringe image 34M obtained at the separate emission position IPFA is also used to generate the super-resolution interference-fringe image 113 in addition to the interference-fringe images 34K obtained at the current emission position IP and the next emission position IP. Thus, compared to Embodiment 2-1 described above in which the interference-fringe image 34M obtained at the separate emission position IPFA is discarded, it is possible to finish shooting without waste in a short time.

Instead of combining the two intermediate interference-fringe images 34 interposed between the two first and last interference-fringe images 34 among the series of four interference-fringe images 34 whose determination results 121 indicate the interference-fringe images 34K to generate the selected interference-fringe image 123, one of the two intermediate interference-fringe images 34 interposed between the two first and last interference-fringe images 34 may serve as the selected interference-fringe image 123.

In Embodiment 1 described above, the example of the control of setting the light quantity of the coherent light 23 to the second set light quantity SLIL different from the first set light quantity SLIK during switching from the current emission position IP to the next emission position IP has been described. Also, in Embodiment 2-1 and Embodiment 2-2 described above, the example of the control of causing the coherent light 23 to be emitted at the separate emission position IPFA separated by at least one emission position IP from both the current emission position IP and the next emission position IP during switching from the current emission position IP to the next emission position IP has been described. As described below, these controls may be performed in combination.

Figure 37:
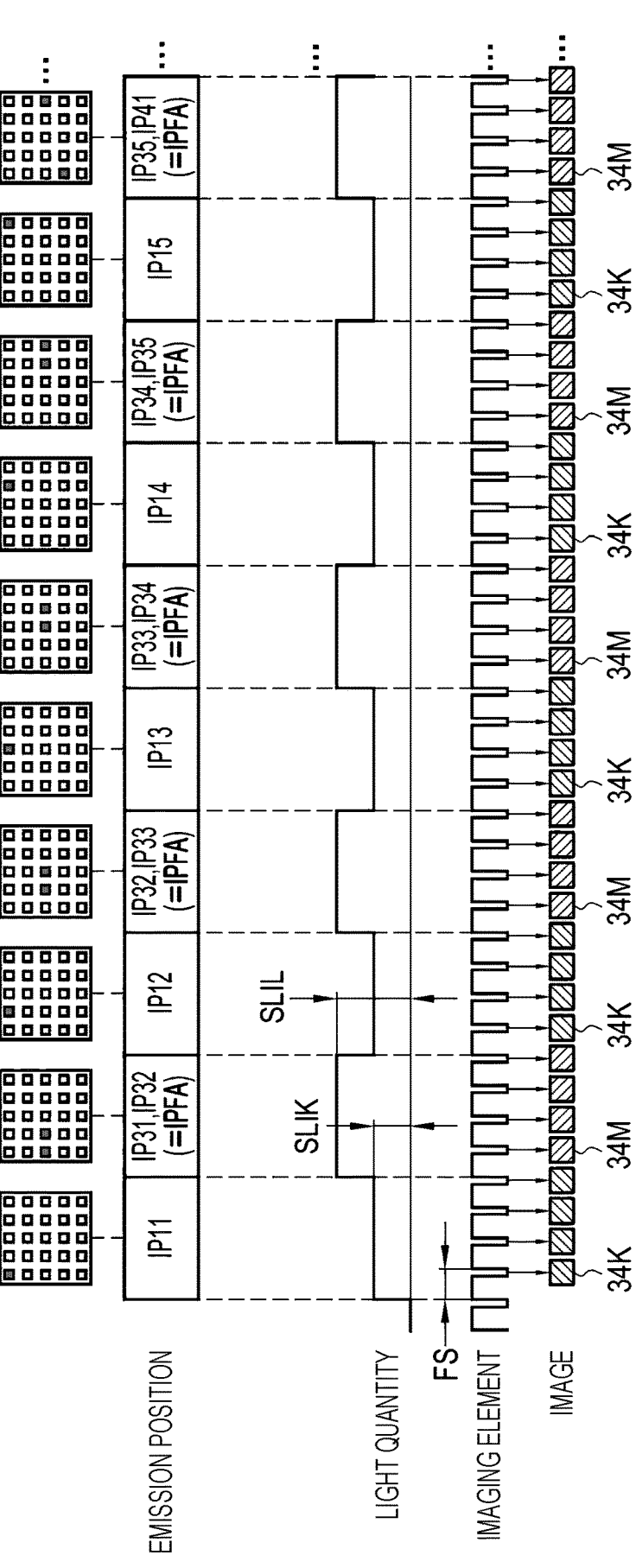
FIG. 37 is a timing chart illustrating a state of operation control of a light source by a light source control unit and operation control of an imaging element by an imaging control unit according to a combined mode of Embodiment 1 and Embodiment 2.

As illustrated in FIG. 37, and Tables 220 in FIG. 38 as an example, when the shooting start instruction of the interference-fringe image 34 is input, the light source control unit 65 performs control of causing the coherent light 23 with the first set light quantity SLIK to be emitted from the emission positions IP11 to IP55 sequentially one by one. Also, the light source control unit 65 performs control of causing the coherent light 23 with the second set light quantity SLIL (substantially twice the first set light quantity SLIK) different from the first set light quantity SLIK to be emitted at the separate emission position IPFA during switching from the current emission position IP to the next emission position IP. The separate emission position IPFA in this case is also the emission position IP of the coherent light 23 with the second set light quantity SLIL.

FIG. 37 illustrates a transition from the emission position IP11 to the emission position IP15. First, the light source control unit 65 causes the coherent light 23 with the first set light quantity SLIK to be emitted from the emission position IP11. During this period, the imaging control unit 66 causes the imaging element 22 to output four interference-fringe images 34K. Subsequently, the light source control unit 65 causes the coherent light 23 with the second set light quantity SLIL to be emitted from the emission positions IP31 and IP32 that are the separate emission positions IPFA. During this period, the imaging control unit 66 causes the imaging element 22 to output four interference-fringe images 34M. Then, the light source control unit 65 causes the coherent light 23 with the first set light quantity SLIK to be emitted from the emission position IP12. During this period, the imaging control unit 66 causes the imaging element 22 to output four interference-fringe images 34K. Subsequently, the light source control unit 65 causes the coherent light 23 with the second set light quantity SLIL to be emitted from the emission positions IP32 and IP33 that are the separate emission positions IPFA. During this period, the imaging control unit 66 causes the imaging element 22 to output four interference-fringe images 34M. Thereafter, the light source control unit 65 and the imaging control unit 66 perform similar control.

Table 220 in FIG. 38 summarizes the current emission position IP, the next emission position IP, and the separate emission position IPFA. For example, when the current emission position IP is IP35, the separate emission positions IPFA are the emission positions IP55 and IP21. Also, for example, when the current emission position IP is IP44, the separate emission positions IPFA are the emission positions IP24 and IP25.

As described above, the control of setting the light quantity of the coherent light 23 to the second set light quantity SLIL different from the first set light quantity SLIK during switching from the current emission position IP to the next emission position IP, and the control of causing the coherent light 23 to be emitted at the separate emission position IPFA separated by at least one emission position IP from both the current emission position IP and the next emission position IP during switching from the current emission position IP to the next emission position IP may be performed in combination. Even with this aspect, it is possible to smoothly proceed with the generation of the super-resolution interference-fringe image 113.

The control of the light source 20 and the control of the imaging element 22 may be performed by separate independent control devices.

The shooting mode of the interference-fringe image 34 is not limited to the exemplified moving image shooting in which the interference-fringe image 34 is continuously output at the predetermined frame interval FS. Continuous shooting in which the interference-fringe image 34 is continuously output at an interval longer than the frame interval FS, for example, at an interval of 0.1 sec to 1 sec may be performed.

The light emitting unit 41 may be, for example, a tip portion of an optical fiber connected to a laser diode that emits the coherent light 23, the optical fiber guiding the coherent light 23 emitted by the laser diode. The arrangement of the light emitting units 41 (the emission positions IP) is not limited to the exemplified square arrangement. The light emitting units 41 may be arranged in a staggered manner. Also, the number, size, and interval of the light emitting units 41 are not limited to the exemplified numerical values. The number, size, and interval of the light emitting units 41 can be appropriately changed in accordance with the size of the pixel 45 of the imaging element 22, the size of the cell 12, or the like.

The observation target object is not limited to the exemplified cell 12. Bacteria, viruses, or the like, may be the observation target object. Also, the diffracted light is not limited to the diffracted light 30 transmitted through the observation target object, and may be diffracted light reflected by the observation target object. Further, the coherent light 23 from the light source 20 may be separated into light to be diffracted and light to be referenced, and the observation target object may be irradiated with the light to be diffracted and the light to be referenced. The illumination light does not have to be the coherent light 23, and may be any light as long as the interference fringes 33 that can be used for observation are generated.

The hardware configuration of the computer 55 of the imaging apparatus 10 can be variously modified. For example, the computer 55 may be constituted of a plurality of computers separated as hardware for the purpose of improving processing capability and reliability. For example, the function of the light source control unit 65 and the function of the imaging control unit 66 are distributed and assigned to two computers. Similarly, in the information processing apparatus 11, the functions of the respective processing units 100 to 106 may be distributed and assigned to two computers. Some or all of the functions of the computer 55 of the imaging apparatus 10 may be assigned to the information processing apparatus 11.

As described above, the hardware configuration of the computer can be appropriately changed in accordance with required performance such as processing capability, safety, and reliability. Further, without being limited to hardware, application programs such as the operating programs 60 and 90 may be duplicated or may be distributed and stored in a plurality of storages for the purpose of ensuring safety and reliability.

In each of the above-described embodiments, for example, as a hardware structure of a processing unit that executes various kinds of processing, such as the light source control unit 65, the imaging control unit 66, the transmission control unit 67, the RW control unit 100, the luminance calculation unit 101, the determination unit 102, the image selection unit 103, the super-resolution processing unit 104 (the alignment processing unit 125 and the generation unit 126), the reconstruction processing unit 105, and the display control unit 106, the following various processors can be used. As described above, the various processors include, in addition to the CPUs 52 and 82 that are general-purpose processors that execute software (the operating programs 60 and 90) to function as various processing units, a programmable logic device (PLD) that is a processor whose circuit configuration can be changed after manufacture, such as a field programmable gate array (FPGA); a dedicated electric circuit that is a processor having a circuit configuration designed exclusively for executing specific processing, such as an application specific integrated circuit (ASIC); and the like.

One processing unit may be constituted of one of these various processors, or may be constituted of a combination of two or more processors of the same type or different types (for example, a combination of a plurality of FPGAs and/or a combination of a CPU and an FPGA). Alternatively, a plurality of processing units may be constituted of one processor.

As an example in which the plurality of processing units are constituted of one processor, first, there is an embodiment in which one processor is constituted of a combination of one or more CPUs and software, and the processor functions as the plurality of processing units, as typified by computers such as a client and a server. Second, there is an embodiment of using a processor that implements the functions of the entire system including the plurality of processing units by one integrated circuit (IC) chip, as typified by a system on chip (SoC) or the like. As described above, the various processing units are constituted using one or more of the above-described various processors as the hardware structure.

Further, as a hardware structure of these various processors, more specifically, an electric circuit (circuitry) obtained by combining circuit elements such as semiconductor elements can be used.

The technology of the present disclosure can be provided by appropriately combining the above-described various embodiments and various modification examples. Also, the technology of the present disclosure is not limited to the above-described embodiments, and various configurations may be employed without departing from the spirit of the present disclosure. Further, the technology of the present disclosure extends to a storage medium that non-transitorily stores the program, in addition to the program.

The content described above and the content illustrated in the drawings are detailed description of parts relating to the technology of the present disclosure, and are merely examples of the technology of the present disclosure. For example, the description relating to the above-described configurations, functions, operations, and effects is description relating to an example of the configurations, functions, operations, and effects of the parts relating to the technology of the present disclosure. Hence, it is clear that unnecessary parts may be deleted, new elements may be added, or replacement may be performed on the described content and the illustrated content described above without departing from the spirit of the technology of the present disclosure. Also, in order to avoid complexity and to facilitate understanding of the parts relating to the technology of the present disclosure, description relating to common general technical knowledge and the like that do not particularly require description for enabling the technology of the present disclosure to be practiced in the description content and the illustrated content described above is omitted.

In this specification, "A and/or B" is synonymous with "at least one of A or B". That is, "A and/or B" means that A alone may be present, B alone may be present, or a combination of A and B may be present. Also, in this specification, when three or more matters are combined and expressed by "and/or", the same idea as "A and/or B" is applied.

All documents, patent applications, and technical standards mentioned in this specification are incorporated herein by reference to the same extent as if each individual document, patent application, or technical standard was specifically and individually indicated to be incorporated by reference.

What is claimed is:

1. A light source control device that controls an operation of a light source that irradiates an observation target object with illumination light to generate interference fringes of the observation target object, the light source having a configuration in which a plurality of light emitting units of the illumination light are arranged at a plurality of emission positions, the light source control device comprising:

a processor,
wherein the processor performs
control of causing the illumination light with a first set light quantity to be emitted from the plurality of emission positions one by one in order to obtain a plurality of interference-fringe images serving as a source of a super-resolution interference-fringe image with a resolution exceeding a resolution of an imaging element that picks up an image of the interference fringes, and
at least one of
control of setting a light quantity of the illumination light to a second set light quantity different from the first set light quantity during switching from a current emission position to a next emission position, or
control of causing the illumination light to be emitted at a separate emission position separated by at least one emission position from both the current emission position and the next emission position during the switching from the current emission position to the next emission position.

2. The light source control device according to claim 1, wherein the processor sets the light quantity of the illumination light to the second set light quantity by causing the illumination light to be simultaneously emitted at least two emission positions during the switching from the current emission position to the next emission position.

3. The light source control device according to claim 1, wherein the processor sets the light quantity of the illumination light to the second set light quantity by causing the illumination light not to be emitted during the switching from the current emission position to the next emission position.

4. The light source control device according to claim 1, wherein, when the control of causing the illumination light to be emitted at the separate emission position during the switching from the current emission position to the next emission position is performed, the interference-fringe image obtained at the separate emission position is also used in addition to the interference-fringe images obtained at the current emission position and the next emission position to generate the super-resolution interference-fringe image.

5. The light source control device according to claim 1, wherein the light source is a vertical cavity surface emitting laser array element.

6. The light source control device according to claim 1, wherein the observation target object is a cell being cultured.

7. The light source control device according to claim 1, wherein the illumination light is coherent light.

8. A digital holography system comprising:
the light source;
the light source control device according to claim 1; and
the imaging element,
wherein the imaging element continuously outputs a plurality of images while the light source emits the illumination light with the first set light quantity from the plurality of emission positions one by one.

9. An operating method of a light source control device that controls an operation of a light source that irradiates an observation target object with illumination light to generate interference fringes of the observation target object, the light source having a configuration in which a plurality of light emitting units of the illumination light are arranged at a plurality of emission positions, the operating method comprising:

performing control of causing the illumination light with a first set light quantity to be emitted from the plurality of emission positions one by one in order to obtain a plurality of interference-fringe images serving as a source of a super-resolution interference-fringe image with a resolution exceeding a resolution of an imaging element that picks up an image of the interference fringes; and performing at least one of control of setting a light quantity of the illumination light to a second set light quantity different from the first set light quantity during switching from a current emission position to a next emission position, or control of causing the illumination light to be emitted at a separate emission position separated by at least one emission position from both the current emission position and the next emission position during the switching from the current emission position to the next emission position.

10. A non-transitory computer-readable storage medium storing an operating program of a light source control device that controls an operation of a light source that irradiates an observation target object with illumination light to generate interference fringes of the observation target object, the light source having a configuration in which a plurality of light emitting units of the illumination light are arranged at a plurality of emission positions, the operating program causing a computer to execute processing, the processing comprising:

performing control of causing the illumination light with a first set light quantity to be emitted from the plurality of emission positions one by one in order to obtain a plurality of interference-fringe images serving as a source of a super-resolution interference-fringe image with a resolution exceeding a resolution of an imaging element that picks up an image of the interference fringes; and performing at least one of control of setting a light quantity of the illumination light to a second set light quantity different from the first set light quantity during switching from a current emission position to a next emission position, or control of causing the illumination light to be emitted at a separate emission position separated by at least one emission position from both the current emission position and the next emission position during the switching from the current emission position to the next emission position.

\* \* \* \* \*